US011599552B2

(12) United States Patent
Tomlinson

(10) Patent No.: US 11,599,552 B2
(45) Date of Patent: *Mar. 7, 2023

(54) COUNTER-BASED COMPACTION OF KEY-VALUE STORE TREE DATA BLOCK

(71) Applicant: Micron Technology, Inc., Boise, ID (US)

(72) Inventor: Alexander Tomlinson, Austin, TX (US)

(73) Assignee: Micron Technology, Inc., Boise, ID (US)

(*) Notice: Subject to any disclaimer, the term of this patent is extended or adjusted under 35 U.S.C. 154(b) by 105 days.

This patent is subject to a terminal disclaimer.

(21) Appl. No.: 17/146,222

(22) Filed: Jan. 11, 2021

(65) Prior Publication Data

US 2021/0133208 A1 May 6, 2021

Related U.S. Application Data

(63) Continuation of application No. 16/156,400, filed on Oct. 10, 2018, now Pat. No. 10,915,546.

(51) Int. Cl.
G06F 16/00 (2019.01)
G06F 16/25 (2019.01)
G06F 7/14 (2006.01)
G06F 16/22 (2019.01)
G06F 16/23 (2019.01)

(52) U.S. Cl.
CPC .......... G06F 16/258 (2019.01); G06F 7/14 (2013.01); G06F 16/2246 (2019.01); G06F 16/2365 (2019.01)

(58) Field of Classification Search
None
See application file for complete search history.

(56) References Cited

U.S. PATENT DOCUMENTS

| 5,204,958 | A | 4/1993 | Cheng et al. |
| 5,530,850 | A | 6/1996 | Ford et al. |
| 6,175,835 | B1 | 1/2001 | Shadmon |
| 6,597,957 | B1 | 7/2003 | Beakley |
| 7,904,487 | B2 | 3/2011 | Ghatare |
| 8,738,657 | B2 | 5/2014 | Kuno et al. |
| 8,935,257 | B1 * | 1/2015 | Vemuri ..................... G06F 7/36 707/741 |
| 9,075,710 | B2 | 7/2015 | Talagala et al. |

(Continued)

FOREIGN PATENT DOCUMENTS

| CN | 102929793 A | 2/2013 |
| CN | 102971732 A | 3/2013 |

(Continued)

OTHER PUBLICATIONS

"International Application Serial No. PCT/US2019/065692, International Preliminary Report on Patentability dated Jun. 24, 2021", 6 pgs.

(Continued)

Primary Examiner — Jean M Corrielus
(74) Attorney, Agent, or Firm — Schwegman Lundberg & Woessner, P.A.

(57) ABSTRACT

Aspects of the present disclosure provide for operations of a key-value tree data structure that merges key-value pair data of a node, in a key-value tree data structure using counter values.

20 Claims, 11 Drawing Sheets

(56) References Cited

U.S. PATENT DOCUMENTS

| | | | |
|---|---|---|---|
| 9,367,260 | B1 | 6/2016 | Natanzon |
| 9,400,816 | B1 | 7/2016 | Gubarev et al. |
| 9,542,918 | B2* | 1/2017 | Matusiak .............. G10H 1/38 |
| 9,858,301 | B1 | 1/2018 | Hardy et al. |
| 10,235,257 | B1 | 3/2019 | Danilov et al. |
| 10,706,105 | B2 | 7/2020 | Boles |
| 10,706,106 | B2 | 7/2020 | Boles et al. |
| 10,719,495 | B2 | 7/2020 | Boles et al. |
| 10,725,884 | B2* | 7/2020 | De Schrijver .......... G06F 16/27 |
| 10,725,988 | B2* | 7/2020 | Boles ................ G06F 16/2246 |
| 10,852,978 | B2 | 12/2020 | Kurichiyath et al. |
| 10,915,546 | B2* | 2/2021 | Tomlinson .......... G06F 16/2246 |
| 10,936,661 | B2 | 3/2021 | Burton et al. |
| 11,048,755 | B2 | 6/2021 | Tomlinson |
| 11,100,071 | B2 | 8/2021 | Tomlinson et al. |
| 11,182,365 | B2 | 11/2021 | Kfir et al. |
| 11,334,270 | B2 | 5/2022 | Kurichiyath et al. |
| 2003/0176931 | A1 | 9/2003 | Pednault et al. |
| 2004/0227758 | A1 | 11/2004 | Curry et al. |
| 2005/0165865 | A1 | 7/2005 | Farmer |
| 2005/0171960 | A1 | 8/2005 | Lomet |
| 2007/0071243 | A1 | 3/2007 | Nanda |
| 2008/0016066 | A1 | 1/2008 | Kuznetsov et al. |
| 2010/0146003 | A1 | 6/2010 | Bruso et al. |
| 2010/0246446 | A1 | 9/2010 | Du et al. |
| 2010/0262617 | A1 | 10/2010 | Shinjo et al. |
| 2010/0281013 | A1 | 11/2010 | Graefe |
| 2011/0246503 | A1 | 10/2011 | Bender et al. |
| 2012/0011106 | A1 | 1/2012 | Reid et al. |
| 2012/0029910 | A1 | 2/2012 | Medlock et al. |
| 2012/0072656 | A1 | 3/2012 | Archak et al. |
| 2012/0223889 | A1 | 9/2012 | Medlock et al. |
| 2012/0278335 | A1 | 11/2012 | Bentkofsky et al. |
| 2013/0080473 | A1 | 3/2013 | Kuno et al. |
| 2013/0103658 | A1 | 4/2013 | Travis |
| 2013/0117524 | A1 | 5/2013 | Helman et al. |
| 2013/0204902 | A1 | 8/2013 | Wang et al. |
| 2013/0218840 | A1 | 8/2013 | Smith et al. |
| 2013/0275656 | A1 | 10/2013 | Talagala et al. |
| 2013/0279503 | A1 | 10/2013 | Chiabaut |
| 2013/0306276 | A1 | 11/2013 | Duchesneau |
| 2014/0064490 | A1 | 3/2014 | Wang et al. |
| 2014/0074841 | A1 | 3/2014 | Majnemer et al. |
| 2014/0082028 | A1 | 3/2014 | Sivasubramanian et al. |
| 2014/0129530 | A1 | 5/2014 | Raufman |
| 2014/0222870 | A1 | 8/2014 | Zhang |
| 2014/0279944 | A1 | 9/2014 | Ghandeharizadeh et al. |
| 2014/0344287 | A1 | 11/2014 | Carvalho et al. |
| 2015/0058291 | A1 | 2/2015 | Earl et al. |
| 2015/0127658 | A1 | 5/2015 | Ding et al. |
| 2015/0178375 | A1 | 6/2015 | Ishizaki |
| 2015/0244558 | A1 | 8/2015 | Tully et al. |
| 2015/0254272 | A1 | 9/2015 | Regni et al. |
| 2015/0286695 | A1 | 10/2015 | Kadayam et al. |
| 2015/0293958 | A1 | 10/2015 | Chen et al. |
| 2015/0301901 | A1 | 10/2015 | Rath et al. |
| 2015/0347495 | A1 | 12/2015 | Wang et al. |
| 2016/0026666 | A1 | 1/2016 | Namiki |
| 2016/0034205 | A1 | 2/2016 | Mehra et al. |
| 2016/0173445 | A1 | 6/2016 | Mosko et al. |
| 2016/0246834 | A1 | 8/2016 | Regni |
| 2016/0275094 | A1 | 9/2016 | Lipcon |
| 2016/0335299 | A1 | 11/2016 | Vemulapati et al. |
| 2017/0017411 | A1 | 1/2017 | Choi et al. |
| 2017/0141791 | A1 | 5/2017 | Balegar et al. |
| 2017/0185622 | A1 | 6/2017 | Prahlad et al. |
| 2017/0192989 | A1 | 7/2017 | Georgiev et al. |
| 2017/0212680 | A1 | 7/2017 | Waghulde |
| 2018/0011766 | A1 | 1/2018 | Lee et al. |
| 2018/0067975 | A1 | 3/2018 | Kato et al. |
| 2018/0089074 | A1 | 3/2018 | Li et al. |
| 2018/0225315 | A1 | 8/2018 | Boles et al. |
| 2018/0225316 | A1 | 8/2018 | Boles et al. |
| 2018/0225321 | A1 | 8/2018 | Boles et al. |
| 2018/0225322 | A1 | 8/2018 | Boles et al. |
| 2018/0253386 | A1 | 9/2018 | Qiu et al. |
| 2019/0034427 | A1 | 1/2019 | Trika et al. |
| 2019/0065557 | A1 | 2/2019 | Boles et al. |
| 2019/0130004 | A1 | 5/2019 | Singh et al. |
| 2020/0004851 | A1 | 1/2020 | Lambov |
| 2020/0117728 | A1 | 4/2020 | Tomlinson et al. |
| 2020/0117744 | A1 | 4/2020 | Tomlinson |
| 2020/0192590 | A1 | 6/2020 | Kurichiyath et al. |
| 2020/0192940 | A1 | 6/2020 | Tomlinson |
| 2020/0210482 | A1 | 7/2020 | Becker et al. |
| 2020/0257669 | A1 | 8/2020 | Boles et al. |
| 2020/0293499 | A1 | 9/2020 | Kohli et al. |
| 2020/0334294 | A1 | 10/2020 | Boles et al. |
| 2020/0334295 | A1 | 10/2020 | Boles et al. |
| 2020/0349139 | A1 | 11/2020 | Boles et al. |
| 2021/0081128 | A1 | 3/2021 | Kurichiyath et al. |
| 2021/0157852 | A1 | 5/2021 | Burton et al. |

FOREIGN PATENT DOCUMENTS

| | | |
|---|---|---|
| CN | 101515298 B | 9/2013 |
| CN | 104156278 A | 11/2014 |
| CN | 105095287 A | 11/2015 |
| CN | 105814846 A | 7/2016 |
| CN | 106021266 A | 10/2016 |
| CN | 106970936 A | 7/2017 |
| CN | 107851102 A | 3/2018 |
| CN | 110268394 A | 9/2019 |
| CN | 110268399 A | 9/2019 |
| CN | 110291518 A | 9/2019 |
| CN | 110383261 A | 10/2019 |
| CN | 113039547 A | 6/2021 |
| CN | 113168408 A | 7/2021 |
| CN | 113196259 A | 7/2021 |
| CN | 113196260 A | 7/2021 |
| CN | 113168408 B | 4/2022 |
| CN | 113039547 B | 6/2022 |
| CN | 113196260 B | 6/2022 |
| JP | 2011233063 A | 11/2011 |
| JP | 2017021494 A | 1/2017 |
| KR | 20020059238 A | 7/2002 |
| KR | 20040103495 A | 12/2004 |
| KR | 20130018602 A | 2/2013 |
| KR | 20130115929 A | 10/2013 |
| KR | 20170008152 A | 1/2017 |
| KR | 102266756 B1 | 6/2021 |
| KR | 102289332 B1 | 8/2021 |
| KR | 102290835 B1 | 8/2021 |
| KR | 102307957 B1 | 10/2021 |
| TW | 200421114 A | 10/2004 |
| TW | 200822066 A | 5/2008 |
| TW | 200836084 A | 9/2008 |
| TW | 201342088 A | 10/2013 |
| TW | 201408070 A | 2/2014 |
| TW | I454166 B | 9/2014 |
| TW | 201837720 A | 10/2018 |
| TW | 201841122 A | 11/2018 |
| TW | 201841123 A | 11/2018 |
| TW | 201842454 A | 12/2018 |
| WO | WO-2018148149 A1 | 8/2018 |
| WO | WO-2018148151 A1 | 8/2018 |
| WO | WO-2018148198 A1 | 8/2018 |
| WO | WO-2018148203 A1 | 8/2018 |
| WO | WO-2020076580 A1 | 4/2020 |
| WO | WO-2020076581 A1 | 4/2020 |
| WO | WO-2020123628 A1 | 6/2020 |
| WO | WO-2020123632 A1 | 6/2020 |

OTHER PUBLICATIONS

"International Application Serial No. PCT/US2019/065702, International Preliminary Report on Patentability dated Jun. 24, 2021", 7 pgs.

"Chinese Application Serial No. 201980074795.1, Response Filed Feb. 21, 2022 to Office Action dated Dec. 6, 2021", W/ English Claims, 23 pgs.

"Chinese Application Serial No. 201980077140.X, Voluntary Amendment Filed Nov. 15, 2021", w/ English Claims, 38 pgs.

(56) References Cited

OTHER PUBLICATIONS

"European Application Serial No. 19872197.9, Response filed Oct. 20, 2021 to Communication pursuant to Rules 161(2) and 162 EPC dated May 26, 2021", 20 pgs.

"Chinese Application Serial No. 201980074795.1, Office Action dated Dec. 6, 2021", w/ English translation, 10 pgs.

"Chinese Application Serial No. 201980074795.1, Voluntary Amendment Filed Oct. 15, 2021", w/ English Claims, 30 pgs.

U.S. Appl. No. 17/094,532, filed Nov. 10, 2020, Key-Value Store Using Journaling With Selective Data Storage Format.

U.S. Appl. No. 17/164,299, filed Feb. 1, 2021, Data Tree With Order-Based Node Traversal.

"U.S. Appl. No. 16/232,422, Response filed Oct. 8, 2020 to Non Final Office Action dated Jul. 17, 2020", 9 pgs.

"U.S. Appl. No. 16/156,440, Examiner Interview Summary dated Oct. 9, 2020", 3 pgs.

"U.S. Appl. No. 16/156,440, Response filed Oct. 22, 2020 to Non Final Office Action dated Jul. 22, 2020", 16 pgs.

"U.S. Appl. No. 16/220,646, 312 Amendment filed Oct. 26, 2020", 7 pgs.

"U.S. Appl. No. 16/232,422, Notice of Allowance dated Oct. 26, 2020", 5 pgs.

"U.S. Appl. No. 16/220,729, Examiner Interview Summary dated Oct. 29, 2020", 2 pgs.

"U.S. Appl. No. 16/220,646, PTO Response to Rule 312 Communication dated Nov. 4, 2020", 2 pgs.

"U.S. Appl. No. 16/220,729, Response filed Nov. 5, 2020 to Non Final Office Action dated Aug. 5, 2020", 13 pgs.

"Korean Application Serial No. 10-2019-7026327, Response filed Dec. 18, 2020 to Notice of Preliminary Rejection dated Oct. 19, 2020", w English Claims, 51 pgs.

"Chinese Application Serial No. 201980083131.1, Response filed Mar. 7, 2022 to Office Action dated Nov. 19, 2021", w/English Claims, 20 pgs.

"European Application Serial No. 19870984.2, Extended European Search Report dated Jun. 8, 2022", 5 pgs.

"European Application Serial No. 19872197.9, Extended European Search Report dated Jun. 13, 2022", 7 pgs.

"Korean Application Serial No. 10-2021-7013687, Notice of Preliminary Rejection dated Jun. 23, 2022", W/English Translation, 4 pgs.

Zeng, Jiaan, et al., "KVLight: A Lightweight Key-Value Store for Distributed Access in Cloud", (May 16, 2016), 473-482.

Zhan, Ling, et al., "WOKV: A write-optimized key-value store", 2018 IEEE 3rd International Conference on Cloud Computing and Big Data Analysis (ICCCBDA), IEEE, (Apr. 20, 2018), 527-531.

"International Application Serial No. PCT/US2019/054243, International Preliminary Report on Patentability dated Apr. 22, 2021", 6 pgs.

"International Application Serial No. PCT/US2019/054254, International Preliminary Report on Patentability dated Apr. 22, 2021", 6 pgs.

"Korean Application Serial No. 10-2019-7026304, Response filed Jan. 28, 2021 to Notice of Preliminary Rejection dated Nov. 30, 2020", w/ English Claims, 26 pgs.

"Korean Application Serial No. 10-2019-7026330, Response filed Feb. 1, 2021 to Notice of Preliminary Rejection dated Nov. 30, 2020", w/ English Claims, 31 pgs.

"Korean Application Serial No. 10-2019-7026533, Response filed Feb. 17, 2021 to Notice of Preliminary Rejection dated Dec. 26, 2020", w/ English Claims, 33 pgs.

"International Application Serial No. PCT/US2018/016892, International Preliminary Report on Patentability dated Aug. 22, 2019", 11 pgs.

"International Application Serial No. PCT/US2018/016892, International Search Report dated Jun. 4, 2018", 3 pgs.

"International Application Serial No. PCT/US2018/016892, Written Opinion dated Jun. 4, 2018", 9 pgs.

"International Application Serial No. PCT/US2018/016906, International Preliminary Report on Patentability dated Aug. 22, 2019", 11 pgs.

"International Application Serial No. PCT/US2018/016906, International Search Report dated Jun. 4, 2018", 3 pgs.

"International Application Serial No. PCT/US2018/016906, Written Opinion dated Jun. 4, 2018", 9 pgs.

"International Application Serial No. PCT/US2018/017043, International Preliminary Report on Patentability dated Aug. 22, 2019", 9 pgs.

"International Application Serial No. PCT/US2018/017043, International Search Report dated May 28, 2018", 3 pgs.

"International Application Serial No. PCT/US2018/017043, Written Opinion dated May 28, 2018", 7 pgs.

"International Application Serial No. PCT/US2018/017056, International Preliminary Report on Patentability dated Aug. 22, 2019", 9 pgs.

"International Application Serial No. PCT/US2018/017056, International Search Report dated Jun. 4, 2018", 4 pgs.

"International Application Serial No. PCT/US2018/017056, Written Opinion dated Jun. 4, 2018", 7 pgs.

"International Application Serial No. PCT/US2019/054243, International Search Report dated Jan. 22, 2020", 3 pgs.

"International Application Serial No. PCT/US2019/054243, Written Opinion dated Jan. 22, 2020", 4 pgs.

"International Application Serial No. PCT/US2019/054254, International Search Report dated Jan. 15, 2020", 3 pgs.

"International Application Serial No. PCT/US2019/054254, Written Opinion dated Jan. 15, 2020", 4 pgs.

"International Application Serial No. PCT/US2019/065692, International Search Report dated Apr. 3, 2020", 3 pgs.

"International Application Serial No. PCT/US2019/065692, Written Opinion dated Apr. 3, 2020", 4 pgs.

"International Application Serial No. PCT/US2019/065702, International Search Report dated Apr. 3, 2020", 3 pgs.

"International Application Serial No. PCT/US2019/065702, Written Opinion dated Apr. 3, 2020", 5 pgs.

"Korean Application Serial No. 10-2019-7026304, Notice of Preliminary Rejection dated Nov. 30, 2020", w/ English translation, 9 pgs.

"Korean Application Serial No. 10-2019-7026327, Notice of Preliminary Rejection dated Oct. 19, 2020", w/ English translation, 20 pgs.

"Korean Application Serial No. 10-2019-7026330, Notice of Preliminary Rejection dated Nov. 30, 2020", w/ English translation, 10 pgs.

"Korean Application Serial No. 10-2019-7026533, Notice of Preliminary Rejection dated Dec. 26, 2020", w/ English translation, 12 pgs.

"NVM Express Revision 1.2 specification", NVM Express, [Online] Retrieved from the internet: <http://nvmexpress.org/resources/specifications>, (Nov. 3, 2014), 1-205.

"Taiwanese Application Serial No. 107104242, Office Action dated Feb. 25, 2019", w/ English Translation, 22 pgs.

"Taiwanese Application Serial No. 107104242, Office Action dated Oct. 2, 2019", w/ English translation, 31 pgs.

"Taiwanese Application Serial No. 107104242, Response filed Jan. 2, 2020 to Office Action dated Oct. 2, 2019", w/ English Claims, 103 pgs.

"Taiwanese Application Serial No. 107104242, Response filed Jun. 4, 2019 to Office Action dated Feb. 25, 2019", w/ English Claims, 105 pgs.

"Taiwanese Application Serial No. 107104545, First Office Action dated Apr. 11, 2019", w/ English translation, 44 pgs.

"Taiwanese Application Serial No. 107104545, Office Action dated Dec. 21, 2018", W/ English Translation, 17 pgs.

"Taiwanese Application Serial No. 107104545, Response filed Mar. 19, 2019 to Office Action dated Dec. 21, 2018", w/English Claims, 15 pgs.

"Taiwanese Application Serial No. 107104545, Response filed Jul. 12, 2019 to First Office Action dated Apr. 11, 2019", w/ English Claims, 124 pgs.

(56) References Cited

OTHER PUBLICATIONS

"Taiwanese Application Serial No. 107104545, Voluntary Amendment Filed Sep. 5, 2019", w/ English Claims, 113 pgs.

"Taiwanese Application Serial No. 107104550, Office Action dated Jan. 9, 2019", W/ English Translation, 28 pgs.

"Taiwanese Application Serial No. 107104550, Response filed Apr. 11, 2019 to Office Action dated Jan. 9, 2019", w/ English Claims, 93 pgs.

"Taiwanese Application Serial No. 107104566, Decision of Rejection dated Jan. 20, 2020", w/ English Translation, 7 pgs.

"Taiwanese Application Serial No. 107104566, First Office Action dated Feb. 14, 2019", w/ English Translation, 36 pgs.

"Taiwanese Application Serial No. 107104566, Response filed Jul. 28, 2020 to Decision of Rejection dated Jan. 20, 2020", w/ English Claims, 36 pgs.

"Taiwanese Application Serial No. 107104566, Response filed Aug. 15, 2019 to First Office Action dated Feb. 14, 2019", w/ English Claims, 104 pgs.

"Transaction Log", Wikipedia, (Accessed on Apr. 8, 2019), 3 pgs.

"Xingbo Wu and Yuehai Xu", LSM-trie: An LSM-tree-based Ultra-Large Key-Value Store for Small Data, https://www.usenix.org/system/files/conference/atc15/atc15-paper-wu.pdf, (Jul. 8-10, 2015), 13 pgs.

Amur, Hrishikesh, et al., "Design of a Write-Optimized Data Store", [Online] Retrieved from the internet: <https://smartech.gatech.edu/handle/1853/53627>, (2013), 12 pgs.

Bagwell, Phil, "Ideal Hash Trees", EPFL Technical Report, (2001), 19 pgs.

Clements, Austin T, et al., "Scalable Address Spaces Using RCU Balanced Trees", (2012), 12 pgs.

Ghosh, Mainak, et al., "Fast Compaction Algorithms for NoSQL Databases", IEEE 35th International Conference on Distributed Computing Systems, (2015), 10 pgs.

Kang, Jeong-Uk, et al., "The Multi-streamed Solid-State Drive", 5 pgs.

Lim, Heyontaek, et al., "Towards Accurate and Fast Evaluation of Multi-Stage Log-Structured Designs", USENIX Association 14th USENIX Conference on File and Storage Technologies FAST 16, (2016), 149-166.

Lu, Lanyue, et al., "WiscKey: Separating Keys from Values in SSD-conscious Storage", 14th USENIX Conference, (2016), 17 pgs.

O'Neil, Patrick E., et al., "The Log-Structured Merge-Tree", ACTA Informatica 33(4), (1996).

Papapetrou, Odysseas, et al., "Cardinality estimation and dynamic length adaptation for Bloom filters", 34 pgs.

Peng, Wang, et al., "An Efficient Design and Implementation of LSM-Tree based Key-Value Store on Open-Channel SSD", Proceedings of the Ninth European Conference on Computer Systems (EuroSys 2014), Article No. 6, (Apr. 2014), 14 pgs.

Putze, Felix, et al., "Cache-, Hash- and Space-Efficient Bloom Filters", (2007), 14 pgs.

Trong-Dat, Nguyen, et al., "Opportunity of using Multi-Streamed SSD in MongoDB", In: Korea Computer Congress 2016, [Online] Retrieved from the internet: <http://www.dbpia.co.kr/Article/NODE07018146>, (Jun. 2016), 169-171.

Xingbo, Wu, et al., "LSM-trie: An LSM-tree-based Ultra-Large Key-Value Store for Small Data", Proceedings of 2015 USENIX Annual Technical Conference,, (Jul. 8-10, 2015), 71-82.

Yuzhe, Tang, et al., "Deferred Lightweight Indexing for Log-Structured Key-Value Stores", 15th IEEE/ACM International Symposium on Cluster, Cloud and Grid Computing (CCGrid), (May 4-7, 2015), 10 pgs.

* cited by examiner

COUNTER-BASED COMPACTION OF KEY-VALUE STORE TREE DATA BLOCK

PRIORITY APPLICATION

This application is a continuation of U.S. application Ser. No. 16/156,400, filed Oct. 10, 2018, which is incorporated herein by reference in its entirety.

TECHNICAL FIELD

Embodiments of the disclosure relate generally to memory sub-systems and more specifically, to operation of a key-value store (KVS) tree data structure.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
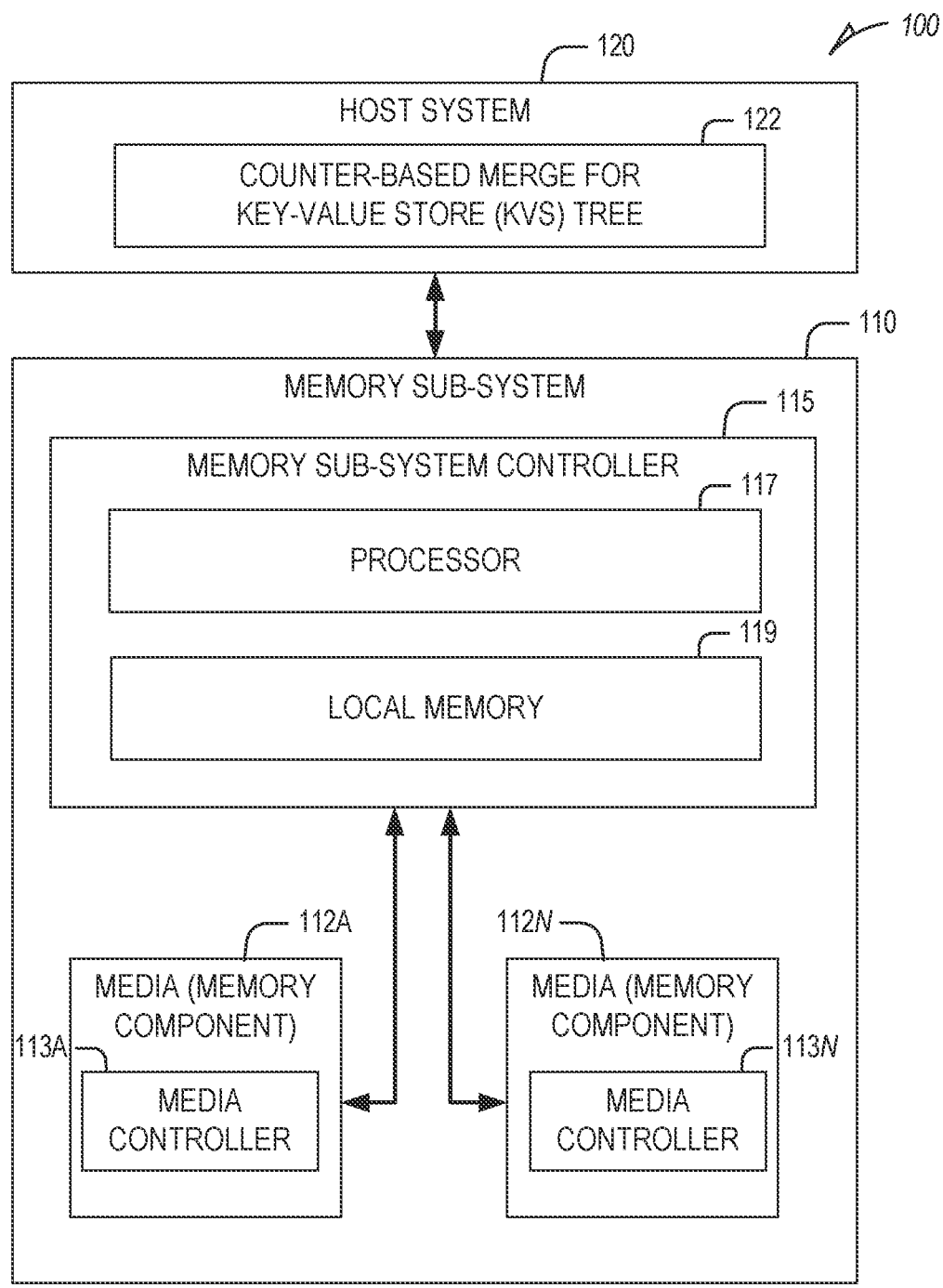
FIG. 1 is a block diagram illustrating an example computing environment including a memory sub-system, in accordance with some embodiments of the present disclosure.

Aspects of the present disclosure are directed to merging key-value sets in a key-value tree data structure, which may be used by or in conjunction with a memory sub-system. A memory sub-system is also hereinafter referred to as a "memory device." An example of a memory sub-system is a storage system, such as a SSD. In some embodiments, the memory sub-system is a hybrid memory/storage sub-system. In general, a host system can utilize a memory sub-system that includes one or more memory components. The host system can provide data (e.g., via write requests) to be stored at the memory sub-system and can request data to be retrieved (e.g., via read requests) from the memory sub-system.

A memory sub-system can include multiple memory components that can store data from the host system. The memory sub-system can further include a memory sub-system controller that can communicate with each of the memory components to perform operations such as reading data, writing data, or erasing data at the memory components in response to requests received from the host system. Any one or more of the memory components of the memory sub-system may include a media controller to manage memory cells of the memory component, communicate with the memory sub-system controller, and execute memory requests (e.g., read or write) received from the memory sub-system controller.

In some applications, such as database storage and volume data storage (e.g., cloud storage), key-value data structures are used to store data on data storage media, such a pool of data storage media (media pool) implemented by one or more memory devices and presented as a single logical data storage volume comprising one or more media data blocks (media blocks). A key-value store (KVS) can comprise one or more key-value data structures to store and search for key-value pairs. The key-value data structures can permit efficient searches of stored data of key-value pairs, permit efficient storage of sparse data, or permit efficient storage of searchable data. Generally, key-value data structures accept a key-value pair for storage and are configured to respond to queries for a value based on a key. Key-value data structures may comprise such structures as tree data structures, examples of which include log-structured merge tree (LSM tree) and a key-value store (KVS) tree (also referred to herein as a key-value store tree data structure or KVS tree data structure).

Aspects of the present disclosure provide various embodiments for merging (e.g., compacting) key-value pair data of a node, in a key-value tree data structure (KVS tree), using counter values. Depending on the embodiment, the data storage media storing the KVS tree may be implemented using a log-structured system (e.g., journal-based system) comprising one or more log-structured index, where data may be batched into groups (e.g., logs), which can provide better data performance with respect to the data storage media. For some embodiments, the data batch-based operation of log-structure data storage media is well suited for a KVS tree, which may store key-value pairs as an index that can be queried with a key to return a value (paired with the key) and where the index may be updated in batches. In particular, for some embodiments, each update to an index of the KVS tree comprises an index itself (also referred to herein as a sub-index of the index).

For example, with respect to an index S that is initially empty, the first, second, third . . . Nth updates to S may comprise sub-indexes S(1), S(2), S(3), . . . S(N) respectively, where each of S(1), S(2), S(3), . . . S(N) comprises an index itself. In this way, index S can be considered a sequence of sub-indexes (S=(S(N), . . . , S(2), S(1))) ordered from newest to oldest where updates are prepended to the sequence (or alternatively, from oldest to newest—S=(S(1), (2), S(3), . . . S(N)) where updates are postpended to the sequence).

According to some embodiments, to search index S, a search operation (e.g., searching for a value paired to a key of interest) first searches in sub-index S(3) since it is the most recent update to S and, thus, has the most recent data; if nothing is found in S(3), then the search operation searches in S(2); if nothing is found in S(2), then the search operation searches in S(1). As more updates are applied to index S, the sequence of sub-indexes can keep increasing, and more garbage data can accumulate in the form of old or obsolete data contained in prior updates (e.g., S(2) and S(1)), which in turn can decrease search efficiency (e.g., more data may need to be read and searched to find a value paired to a particular key).

Accordingly, various embodiments described herein can restore search efficiency of an index S that comprises a sequence of sub-indexes by merging (e.g., compacting) a sub-sequence of sub-indexes, of the sequence of sub-indexes, to a merged sub-index and replacing the sub-sequence of sub-indexes (within the sequence of sub-indexes) with the merged sub-index. In particular, for some embodiments, the index S comprises a key-value store tree data structure (KVS tree) as described herein, where one or more nodes of the KVS tree are used to store the sequence of sub-indexes, and where each sub-index S(i) comprises a key-value set for storing one or more key-value pairs. As such, key-value sets received by the KVS tree (e.g., through the root node) can serve as key-value pair updates to the index S.

According to some embodiments described herein, the merge operation of a sub-sequence of sub-indexes (e.g., key-value sets) can eliminate accumulated garbage data (e.g., old or obsolete key or value data) and can shorten the overall length of a sequence of sub-indexes that comprises the sub-sequence (smaller length can result in better query performance). Depending on the embodiment, the sub-sequence of sub-indexes (e.g., key-value sets) can comprise the entire sequence of sub-indexes, or less than the entire sequence of sub-indexes (e.g., the sub-sequence comprises the beginning, middle or end portion of the sequence). The merged sub-index (e.g., merged key-value set) may be larger (e.g., store more data that needs to be searched) khan each of the sub-indexes in the sequence but smaller (e.g., store less data than needs to be searched) than retaining the sequence of sub-indexes as-is. As used herein, the merged sub-index (e.g., key-value set) may be represented as S(i,j) where i>j and where S(i,j) indicates that the merged sub-index S(i,j) is the result of merging all sub-indexes S(k) where i⇐k⇐j (e.g., merging key-value sets i through j).

Various embodiments described herein merge a sub-sequence of sub-indexes (e.g., key-value sets) of an index S, while managing a balance between the length of the index S, and reducing write operations (e.g., write amplification) with respect to data storage media used to store the index S. Where one or more memory devices implementing the data storage media comprise certain types of memory devices (e.g., QLC NAND cell memory devices) having lower write performance and endurance characteristics than other types of memory devices (e.g., TLC NAND cell memory devices), reducing (e.g., minimizing) write operations with respect to the data storage media can improve data performance characteristics of the data storage media. For instance, consider where a sequence of sub-indexes (e.g., updates) to index S comprises sub-indexes S(1), S(2), . . . S(N), where each sub-index S(i) (e.g., update) contains M bytes of data, and where the sequence of updates does not produce garbage data (e.g., old or obsolete key or value data) in the index S. The sequence of updates would comprise N*M data and, as such, at least PPM bytes would be written to the data storage media (assuming compression is not used) when the sequence of updates is written to the data storage media. For example, a merge operation of two sub-indexes each indexing size M bytes, would result in 2*M bytes to be read from the data storage media, and 2*M bytes to be written to the data storage media. Merging a sequence of sub-indexes to a merged sub-index in accordance with some embodiments can effectively reduce the amount of data read and written with respect to the sequence of sub-indexes. This in turn can improve the overall performance of data storage media (implemented by a set of memory components, such as a set of NAND-type memory devices) that use a KVS tree for storing data (e.g., user data) as key-value pairs.

According to some embodiments, a merge (e.g., compaction) operation is performed as follows with respect to an index S, which can store a sequence of sub-indexes. The merge operations may comprise a parameter r, which that must be greater than 1 (e.g., r=4). Each sub-index S(i) in index S may be assigned a merge count value (e.g., compaction count), designated herein as mc. When a Nth update (comprising sub-index S(N)) is received for the index S, the merge operation can assign S(N) a mc value of 0 (or some other default initial value), and then append S(A) to the current sequence of sub-indexes in the index S (e.g., S=(S(N), . . . ) where the newest updates are prepended to index S. Thereafter, while index S contains a sub-sequence of sub-indexes where the sub-sequence comprises r number of sub-indexes (e.g., 4 sub-indexes where r=4) that share the same Inc value (e.g., 0, 1, 2, etc.), the merge operation can perform the following: set x to the mc value shared by each sub-index in the sub-sequence; merge the sub-sequence of sub-indexes into a new (merged) sub-index; assign the merged sub-index a mc value of x+1 (or some other default increment value); and replace the sub-sequence of sub-indexes in the sequence with the merged sub-index.

To illustrate an example of the foregoing merge operation, assume an example parameter r set to 4, an example index $S_{EG}$ that is initially empty, and that an kth update is applied to the index $S_{EG}$ by prepending a sub-index $S_{EG}(k)$ to the index $S_{EG}$. After the first three updates to the index $S_{EG}$, the index $S_{EG}$ would have three sub-indexes (e.g., S=($S_{EG}(3)$, $S_{EG}(2)$, $S_{EG}(1)$)) that each has an Inc value of 0. At this point, the state of mc values for the index $S_{EG}$ can be represented as [0, 0, 0]. When the fourth update is applied to the index $S_{EG}$, the state can be represented as [0, 0, 0, 0] after the example merge operation has updated the index $S_{EG}$ with the fourth update (e.g., S=($S_{EG}(4)$, $S_{EG}(3)$, $S_{EG}(2)$, $S_{EG}(1)$)), Based on the state of [0, 0, 0, 0], the example merge operation detects a sub-sequence of four sub-indexes having the mc value of 0 (e.g., sub-sequence of $S_{EG}(4)$, $S_{EG}(3)$, $S_{EG}(2)$, $S_{EG}(1)$ in the index $S_{EG}$), sets x to a value of 0, merges together the detected sub-sequence to produce a new merged sub-index $S_{EG}(1,4)$, and assigns the merged sub-index $S_{EG}(1,4)$ an mc value of x+1 (i.e., 1). The example merge operation then replaces the detected sub-sequence in the index $S_{EG}$ (e.g., S=($S_{EG}(1,4)$)) with the merged sub-index $S_{EG}(1,4)$ and, as a result, the state of mc values for the index $S_{EG}$ now comprises [1]. Assuming another three updates (i.e., $S_{EG}(7)$, $S_{EG}(6)$, $S_{EG}(5)$) are applied to the index $S_{EG}$ (e.g., S=($S_{EG}(7)$, $S_{EG}(6)$, $S_{EG}(5)$, $S_{EG}(1,4)$), the state of mc values of the index $S_{EG}$ would comprise [0, 0, 0, 1] and, as such, the example merge operation would not detect a sub-sequence of four sub-indexes having the same Inc value. Upon receiving and applying the next update (e.g., S=($S_{EG}(8)$, $S_{EG}(7)$, $S_{EG}(6)$, $S_{EG}(5)$, $S_{EG}(1,4)$), the state of inc values of the index $S_{EG}$ would comprise [0, 0, 0, 0, 1], and the example merge operation would detect a sub-sequence of four sub-indexes having the mc value of 0 (e.g., sub-sequence of $S_{EG}(8)$, $S_{EG}(7)$, $S_{EG}(6)$, $S_{EG}(5)$ in the index $S_{EG}$). As before, the example merge operation sets x to a value of 0, merges together the detected sub-sequence to produce a new merged sub-index $S_{EG}(5,8)$, and assigns the merged sub-index $S_{EG}(5,8)$ an mc value of x+1 (i.e., 1). The example merge operation then replaces the detected sub-sequence in the index $S_{EG}$ (e.g., S=($S_{EG}(5,8)$, $S_{EG}(1,4)$)) with the merged sub-index $S_{EG}(5,8)$ and, as a result, the state of mc values for the index $S_{EG}$ now comprises [1,1].

Assuming additional subsequent updates to the index $S_{EG}$, the state of Inc values for the index $S_{EG}$ may eventually comprise [0, 0, 0, 0, 1, 1, 1], which will result in the example merge operation: detecting a sub-sequence of four sub-indexes having the me value of 0 (at the beginning of the index $S_{EG}$); setting x to a value of 0; merging together the detected sub-sequence to produce a new merged sub-index; assigning the merged sub-index an mc value of x+1 (i.e., 1); and replacing the detected sub-sequence in the index $S_{EG}$ with the merged sub-index Sm. The resulting state of mc values for the index $S_{EG}$ would comprises [1, 1, 1, 1]. Based on this state, before another update is even applied to the index $S_{EG}$, the example merge operation could detect another sub-sequence of four sub-indexes having the mc value of 1. Accordingly, the example merge operation could: set x to a value of 1; merge together the detected sub-sequence to produce a new merged sub-index; assign the merged sub-index an mc value of x+1 (i.e., 2); and replace the detected sub-sequence in the index Sm with the merged sub-index $S_{EG}$, thereby resulting in a new state of [2]. The example merge operation could continue to perform in this manner for subsequent updates to the index $S_{EG}$. The following Table 1 illustrates example states of mc values based on operation of the example merge operation on the index $S_{EG}$.

TABLE 1

| State of mc values $S_{EG}$ | $S_{EG}$ Description |
|---|---|
| 00 | $S_{EG}$ has two updates (sub-indexes) applied, both with mc == 0 |
| 000 | Third update arrives, also with mc == 0 |
| 0000 --> 1 | Fourth update creates 4 sub-indexes with mc == 0 that are merged into one merged sub-index with mc == 1 |
| 0001 | Three more updates arrive, each with mc == 0 |
| 00001 --> 11 | Next update, another merge is performed, left with 2 sub-indexes with mc == 1 |
| 000011 --> 111 | Another four updates arrive, another merge is performed, left with 3 sub-indexes with mc == 1 |
| 0000111 --> 1111 --> 2 | Another four updates arrive, double merge is performed, left with 1 @ mc == 2 |
| 22 | State of mc values after another 16 updates to $S_{EG}$ |
| 222 | State of mc values after another 16 updates to $S_{EG}$ |
| 3 | State of mc values after another 16 updates to $S_{EG}$ |

As used herein, a KVS tree comprises a tree data structure comprising nodes with connections between parent and child nodes based on a predetermined derivation of a key (e.g., rather than the content of the tree). Each node can comprise an ordered (e.g., temporally ordered) sequence of key-value sets (also referred to herein as kvsets). Where temporally ordered, later key-value sets in the sequence can represent older key-value sets. The kvsets can comprise one or more key-value pairs, which permit, values to be stored in the KVS tree with corresponding keys that reference the values. Accordingly, within a KVS tree, kvsets function as individual key and value stores organized in the nodes of the KVS tree. The key-value pairs within a given kvset may be key-sorted. Every key within a given kvset may be unique from the other keys in the kvset; however, keys within the KVS tree may not be unique (e.g., two different kvset within a single node or in different nodes of the KVS tree may include the same key). Each kvset may be immutable once written to a node (e.g., once placed/stored in a node, a kvset does not change). Though a kvset within a node may be immutable, the kvset may be deleted or some or all of the kvset's data contents may be added to a new kvset.

A kvset may comprise a key tree to store key entries of key-value pairs of the kvset, where a given key entry may comprise both a key and a reference to a value. A variety of data structures may be used to efficiently store and retrieve unique keys in the key tree (e.g., it may not even be a data tree), such as binary search trees, B-trees, etc. For example, the keys are stored in leaf nodes of the key tree, where a maximum key in any subtree of the key tree may be in a rightmost entry of a rightmost child, a rightmost edge of a first node of the key tree is linked to a sub-node of the key tree, and all keys in a subtree rooted at the sub-node of the key tree may be greater than all keys in the first node of the key tree.

For some embodiments, key entries of the kvset are stored in a set of key data blocks (also referred to as key blocks or kblocks), which can comprise a primary key block and zero or more extension key blocks. Members of the set of key blocks may correspond to media data blocks (media blocks) for a data storage medium implemented by a memory device, such as an SSD, hard disk drive, etc. Each key block may comprise a header to identify it as a key block, and a primary key block of a kvset may comprise a list of media block identifications for the one or more extension key blocks of the kvset.

A primary key block may comprise a header to a key tree of the kvset. The header may comprise a number of values to assist or facilitate interactions with the keys, or kvset. For example, the primary key block, or header stored therein, may comprise a copy of a lowest key in a key tree of the kvset, or a copy of a highest key in a key tree of the kvset. The primary key block may comprise a list of media block identifications for a key tree of the kvset. Additionally, the primary key block may comprise a bloom filter header for a bloom filter of the kvset, and the primary key block may comprise a list of media block identifications for a bloom filter of the kvset.

For some embodiments, values of a kvset are stored in a set of value data blocks (also referred to herein as value blocks or vblocks). Each particular value block in the KVS tree may have a data generation number associated with it that indicates a sequence order at which the particular value block was initially generated for the KVS tree. In this way, the data generation number of a particular value block can serve as a time stamp for when the particular value block is initially generated. For instance, data generation numbers may start at a value of "1" for the first value block generated and added to (e.g., a kvset of) a root node of the KVS tree, and the second value block generated and added to (e.g., a kvset of) the root node of the KVS tree would have a data generation number of "2." The data generation number increases with each new value block that is generated and added to the KVS tree through the root node.

Members of the set of value blocks may correspond to media data blocks (media blocks) for a data storage medium implemented by a memory device, which as noted herein can comprise an SSD, hard disk drive, etc. Each value block may comprise a header to identify it as a value block. A value block may comprise a storage section to one or more values without separation between, where bits of a first value can run into bits of a second value on the data storage medium without a guard, container, or other delimiter between them. For various embodiments, a primary key block of a kvset comprises a list of media block identifications for value blocks in the set of value blocks for the kvset. In this way, a primary key block can manage storage references to value blocks within a kvset.

For some embodiments, a data marker associated with a key (hereafter, referred to as a tombstone) is used to indicate that the value corresponding to the key has been deleted. A tombstone may reside in the key entry in association with a key, and no value block space may be consumed for the key-value pair. According to some embodiments, the tombstone marks the deletion of the value associated with the key while avoiding the possibly expensive operation of purging the value from a KVS tree. For some embodiments, when a tombstone is encountered during a temporally ordered search of a KVS tree for a given key, a search process knows that a value corresponding to the given key has been deleted, even if an expired version of the key-value pair associated with that given key resides at a lower (e.g., older) location within the KVS tree.

For some embodiments, the primary key block includes a set of metrics for the kvset. For example, the set of metrics may comprise one or more of the following: a total number of keys stored in the kvset, or a number of keys with tombstone values stored in the kvset; a sum of all key lengths for keys stored in the kvset; a sum of all value lengths for keys stored in the kvset. The last two metrics may provide at least an approximate (if not exact) amount of storage consumed by the kvset. The set of metrics may also comprise, for example, an amount of unreferenced data in value-blocks (e.g., unreferenced values) of the kvset. This last metric can provide an estimate of the space that may be reclaimed in a maintenance operation (e.g., garbage collection operation performed on the KVS tree).

A merge operation of various embodiments may be performed in response to a variety of triggering conditions, such as a condition relating to one or more kvsets in a given node meeting specified or computed criteria. For example, depending on the embodiment, the merge operation described herein may be performed (e.g., triggered) with respect to a given node of a KVS tree in response to an update being performed on the given node, such as the addition (e.g., ingestion) of a new kvset by the given node (e.g., as a result of moving (e.g., spilling) a kvset from a parent node of the given node to the given node). Alternatively, the merge operation may be continuously performed (e.g., running in a background process) with respect to the entire KVS tree or for individual nodes of the KVS tree. Continual performance of the merge operation (e.g., in response to a trigger condition or as a background process) with respect to one or more nodes of the KVS tree can lead to continuous improvement in operation of the KVS tree, especially with respect to searching for values based on keys.

Other examples of kvset-related criteria that can trigger the merge operation described herein comprise, without limitation, the number of kvsets within a given node, the freeing of resources (e.g., media blocks) with respect to the given node, the total size of one or more kvsets within the given node, or the amount of data in the one or more kvsets available for garbage collection. One example of data available for garbage collection in a kvset comprises one or more key-value pairs or tombstones in the kvset rendered obsolete, for instance, by a key-value pair or tombstone in a newer kvset, or a key-value pair that has violated constraint (e.g., a time to live constraint). Another example comprises a condition for performing maintenance (e.g., garbage collection) on the KVS tree. Yet another example comprises receiving a request (e from software application or an operating system of a host system) to initiate a merge operation with respect to one or more nodes of the KVS tree, where the request may also specify whether an entire sequence of kvsets or a sub-sequence of kvsets will be operated upon by the merge operation.

For some embodiments, a merge operation described herein merges a sub-sequence of kvsets, in a sequence of kvsets of a given node, into a merged kvset (of the given node) by merging key blocks of the kvsets while leaving the value blocks of the kvsets as-is. In doing so, the merge operation may write one or more new key blocks (based on existing key blocks of kvsets) for the merged kvset, while avoiding writing new value blocks for the resulting merged kvset (e.g., existing value blocks of kvsets are moved to the merged kvset as-is), thereby reducing the amount of write operations performed with respect to the KVS tree during the merge operation.

For example, the merge operation can merge a sub-sequence, in a sequence (e.g., temporal sub-sequence) of kvsets of a given node, to produce a merged kvset, where the resulting merged kvset comprises a set of new key blocks that reference a set of existing value blocks of the sub-sequence of kvsets. The set of new key blocks may be generated based on copied from) a set of existing key blocks of the sub-sequence of kvsets. For instance, the set of new key blocks may be generated based on the set of existing key blocks of the sub-sequence of kvsets by copying values (e.g., key values and references to existing value blocks) of the set of existing key blocks to the set of new key blocks. Those existing value blocks of the sub-sequence of kvsets that are not referenced by the set of new key-value blocks are retained (e.g., not deleted) but are considered unreferenced.

After the set of new key blocks has been generated, the merge operation can delete, from the given node, each particular key-value set in the sub-sequence of key-value sets, and delete one or more (e.g., all) key blocks of each particular key-value set while leaving one or more (e.g., all) value blocks of each particular key-value set preserved as-is). The preserved value blocks can comprise value blocks referenced by the set of new key blocks, value blocks not referenced by any of the set of new key blocks, or both. All value blocks of the sub-sequence of kvsets (which are preserved as-is) can be moved to the merged kvset. The resulting merged kvset can then replace the sub-sequence of kvsets in the sequence of kvsets. The foregoing operations may be collectively referred to herein as a key compaction (k-compaction), which may be regarded as a form of garbage collection to remove obsolete key blocks and free resources (e.g., media blocks of a data storage media) occupied by those obsolete key blocks.

Alternatively, for some embodiments, a merge operation described herein comprises merging a sub-sequence of kvsets, in a sequence of kvsets of a given node, into a merged kvset (of the given node) by merging key blocks of the kvsets and merging value blocks of the kvsets. In doing so, the merge operation may write new one or more key blocks (based on existing key blocks of kvsets) for the merged kvset, and may write new value blocks (based on existing value blocks of kvsets) for the merged kvset. For example, the merge operation can merge a sub-sequence, in a sequence (e.g., temporal sub-sequence) of kvsets of a given node, to produce a merged kvset, where the resulting merged kvset comprises a set of new key blocks that reference a set of new value blocks, where the set of new key blocks is generated based on a set of existing key blocks of the sub-sequence of kvsets, and where the set of new value blocks is generated based on a set of existing value blocks of the sub-sequence of kvsets.

For example, the set of new key blocks may be generated based on the set of existing key blocks of the sub-sequence of kvsets by copying values (e.g., key values) of the set of existing key blocks to the set of new key blocks, and causing new key blocks (in the set of new key blocks) to respectively reference new value blocks (in the set of new value blocks) that correspond to existing blocks referenced by the set of existing key blocks. The set of new value blocks may be generated based on the set of existing value blocks of the sub-sequence of kvsets by copying values of the set of existing value blocks to the set of new value blocks. After the set of new key blocks and the set of new value blocks have been generated, the merge operation can delete, from the given node, each particular kvset in the sub-sequence of kvsets, and delete one or more key blocks of each particular kvset. Additionally, after the set of new key blocks and the set of new value blocks have been generated, one or more existing value blocks (e.g., all existing value blocks) of the sub-sequence of kvsets may be deleted. The resulting merged kvset can then replace the sub-sequence of kvsets in the sequence of kvsets. The foregoing operations may be collectively referred to herein as a key-value compaction (kv-compaction), which may be regarded as a form of garbage collection to remove obsolete key blocks and value blocks and free resources (e.g., media blocks of a data storage media) occupied by those obsolete key blocks and value blocks.

According to some embodiments, a KVS tree is generated and stored on data storage media, implemented by a memory sub-system, where the KVS tree can be used to store data on the data storage media as one or more key-value pairs. Depending on the embodiment, operations described herein may be performed on a host system, on a memory sub-system, or some combination of both.

Disclosed herein are some examples of systems that perform operations relating to merging (e.g., compacting) sub-indexes of an index, such as key-value sets of nodes of a KVS tree, using counter values as described herein.

FIG. 1 illustrates an example computing environment 100 including a memory sub-system 110, in accordance with some examples of the present disclosure. The memory sub-system 110 can include media, such as memory components 112A to 112N. The memory components 112A to 112N can be volatile memory devices, non-volatile memory devices, or a combination of such. In some embodiments, the memory sub-system 110 is a storage system. An example of a storage system is an SSD. In some embodiments, the memory sub-system 110 is a hybrid memory/storage system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or a direct communicative connection (e.g., without intervening components), whether wired or wireless, including connections such as electrical, optical, magnetic, and so forth. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component can include both an SLC portion and an MLC portion of memory cells. Each of the memory cells can store one or more bits of data (e.g., data blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory components 112A to 112N.

Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

The host system 120 includes a counter-based merge for key-value store (KVS) tree 122 (counter-based merge component 122) that can be used to perform a counter-based merge operation as described herein with respect to a KVS tree stored on data storage media (e.g., media pool) implemented by one or more of the memory components 112A to 112N. The KVS tree stored on the data storage media may be one generated by the host system 120, by the memory sub-system 110 (e.g., by the memory sub-system controller 115 at the request of the host system 120), or some combination thereof. Depending on the embodiment, the counter-based merge component 122 may be part of an application or an operating system (e.g., operating system software driver for the memory sub-system 110) on the host system 120. In some embodiments, the memory sub-system 110 includes at least a portion of the counter-based merge component 122. For example, the memory sub-system controller 115 can include a processor 117 (processing device) configured to execute instructions stored in local memory 119 for performing the operations described herein. As noted herein, the merge operation can merge kvsets within a given node of the KVS tree based on counter values of kvsets.

The counter-based merge component 122 may perform the merge operation in response to detecting a condition (e.g., triggering condition), which may include a condition relating to one or more kvsets in a given node meeting specified or computed criteria. For example, depending on the embodiment, the counter-based merge component 122 may perform a merge with respect to a given node of a KVS tree in response to an update being performed on the given node, such as the addition (e.g., ingestion) of a new kvset by the given node (e.g., as a result of moving (e.g., spilling) a kvset from a parent node of the given node to the given node). Other examples of such kvset-related criteria comprise, without limitation, the number of kvsets within a given node, the freeing of resources media blocks) with respect to the given node, the total size of one or more kvsets within the given node, or the amount of data in the one or more kvsets available for garbage collection. The counter-based merge component 122 may operate as a background process that continuously detects for sub-sequences of kvsets to merge with respect to the entire KVS tree or for individual nodes of the KVS tree.

Depending on the embodiment, the counter-based merge component 122 may comprise logic (e.g., a set of machine instructions, such as firmware) or one or more components that causes the memory sub-system 110 (e.g., the memory sub-system controller 115) to perform operations described herein with respect to the counter-based merge component 122. The counter-based merge component 122 may comprise a tangible unit capable of performing operations described herein. Further details with regards to the operations of the counter-based merge component 122 are described below.

Figure 2:
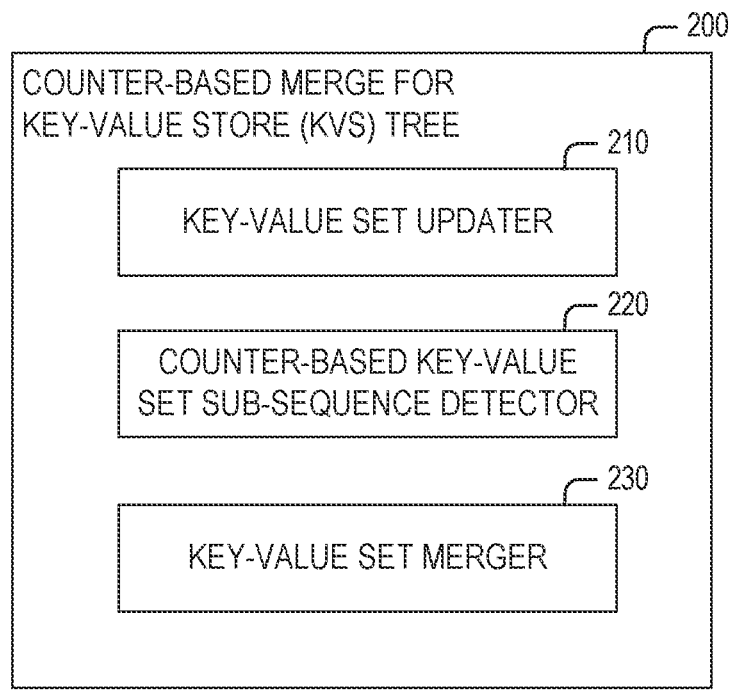
FIG. 2 is a block diagram of an example counter-based merge for key-value store (KVS) tree, in accordance with some implementations of the present disclosure.

FIG. 2 is a block diagram of an example counter-based merge for KVS tree 200 (hereafter, the counter-based merge component 200), in accordance with some implementations of the present disclosure. As illustrated, the counter-based merge component 200 comprises a key-value set updater 210, a counter-based key-value set sub-sequence detector 220, and a key-value set merger 230. For some embodiments, the counter-based merge component 200 may differ in components or arrangement (e.g., less or more components) than what is illustrated in FIG. 2.

As noted herein, the KVS tree operated upon by the counter-based merge component 200 may be stored on a memory sub-system (e.g., 110) to facilitate storage of data (e.g., user data) as key-value pairs. The KVS tree may be part of a plurality of KVS trees that form a key-value store (KVS) database, which may comprise a multilevel tree with a base level comprising heterogeneous kvsets and a second level comprising the root nodes and thus the start) of two or more KVS subtrees that each respectively comprise homogeneous kvsets. The KVS tree may be generated by a host system (e.g., 110), a memory sub-system (e.g., 110), or some combination thereof. The KVS tree may be generated, on a set of memory components, such that the KVS tree comprises a set of nodes, where each node in the set of nodes comprises a sequence of kvsets, and where a kvset in the sequence of kvsets comprises a set of key blocks for storing one or more keys and a set of value blocks for storing one or more values. The sequence of kvsets may be temporally ordered such that kvsets added earlier in the sequence represent older data (e.g., key-value pairs) relative to kvsets recently added.

The key-value set updater 210 associates (e.g., assigns) an individual count value (e.g., merge count value or merge counter value) to each kvset that is added to a sequence of kvsets of a given node of the KVS tree. When initially associated (e.g., initially assigned), the key-value set updater 210 may set each individual count value to a default initial value, such as 0. Additionally, depending on the embodiments, the key-value set updater 210 may be responsible for updating the given node with the kvset or, alternatively, the key-value set updater 210 may merely detect for when the kvset is added to the given node. For example, for some embodiments, the key-value set updater 210 receives the kvset and, in response, updates the given node using the kvset by appending the kvset to the sequence of kvsets of the given node, and associates (e.g., assigns) the added kvset with an initial count value (e.g., that is set to 0 or some other default initial value). The key-value set updater 210 may append the kvset to the sequence by prepending the kvset set to the sequence (e.g., where the newest kvsets in nodes are prepended to key-value set sequences) or postpending the kvset to the sequence (e.g., where the newest kvsets in nodes are postpended to key-value set sequences). Alternatively, for some embodiments, the key-value set updater 210 detects for when a kvset is added to the given node by another operation being performed on the KVS tree and, in response, the key-value set updater 210 associates (e.g., assigns) the added kvset with an initial count value (e.g., that is set to 0 or some other default initial value). The other operation causing the addition of the kvset to the given node may comprise, for example, a move operation (e.g., spill operation) that moves the kvset from another node to the given node. For some embodiments, upon adding the kvset to the given node (or detecting the addition of the kvset to the given node), the key-value set updater 210 may cause trigger) the counter-based key-value set sub-sequence detector 220 to begin performing its respective operations, as described below.

The counter-based key-value set sub-sequence detector 220 detects whether the sequence of sub-indexes of the given node comprises a sub-sequence of kvsets, where the sub-sequence comprises a certain (e.g., predetermined) number of kvsets (e.g., 4 kvsets), where each kvset is associated with a similar count value (e.g., 0, 1, 2, etc.). In response to detecting that the sequence of key-value sets comprises the sub-sequence of key-value sets, the counter-based key-value set sub-sequence detector 220 may cause (e.g., trigger) the key-value set merger 230 to merge and replace the detected sub-sequence of kvsets with a merged kvset.

The key-value set merger 230 merges a particular sub-sequence of kvsets detected by the counter-based key-value set sub-sequence detector 220 to produce a merged kvset, and associates (e.g., assigns) the merged kvset with a new count value that is generated based on the similar count value used by the counter-based key-value set sub-sequence detector 220 to detect the particular sub-sequence of kvsets. For example, generating the new count value that is based on the similar count value may comprise setting the new count value equal to the similar count value incremented by a specific value (e.g., 1), The key-value set merger 230 can then replace the particular sub-sequence of kvsets, in the sequence of kvsets of the given node, with the merged kvset, thereby resulting in an updated sequence of kvsets of the given node. Subsequently, the counter-based key-value set sub-sequence detector 220 can detect whether the updated sequence of the given node comprises another sub-sequence of kvsets, where the sub-sequence comprises a certain (e.g., predetermined) number of kvsets (e.g., 4 kvsets), where each kvset is associated with a similar count value (e.g., 0, 1, 2, etc.). If another sub-sequence of kvsets is detected, the key-value set merger 230 can again perform its operation on the other sub-sequence of kvsets; otherwise, the key-value set updater 210 can wait for the next kvset to be added to the given node.

For some embodiments, the key-value set merger 230 merges the particular sub-sequence of kvsets such that the merged kvset comprises a set of new key blocks that reference a set of existing value blocks of the sub-sequence of kvsets, and the set of new key blocks is generated based on a set of existing key blocks of the sub-sequence of key-value sets (e.g., key values and value block references copied from existing key blocks to new key blocks). For such embodiments, the existing value blocks of the sub-sequence of kvsets may be moved from their respective kvsets to the merged kvset. The key-value set merger 230 may write one or more new key blocks (based on existing key blocks of kvsets) for the merged kvset, while avoiding writing new value blocks for the result merged kvset (e.g., existing value blocks of kvsets are moved to the merged kvset as-is), thereby reducing the amount of write operations performed with respect to the KVS tree during the merge operation.

For various embodiments, the key-value set merger 230 merges the particular sub-sequence of kvsets such that the merged kvset comprises a set of new value blocks and a set of new key blocks that reference the set of new value blocks, where the set of new value blocks is generated based on a set of existing value blocks of the sub-sequence of key-value sets, and where the set of new key blocks is generated based on a set of existing key blocks of the sequence of key-value sets. For such embodiments, the key-value set merger 230 may write one or more new key blocks (based on existing key blocks of kvsets) for the merged kvset, and may write one or more new value blocks (based on existing value blocks of kvsets) for the merged kvset, but can subsequently delete the existing key blocks and the existing value blocks, thereby reclaiming resources (e.g., media blocks on the data storage media) occupied by those existing key blocks and existing value blocks.

Figure 3:
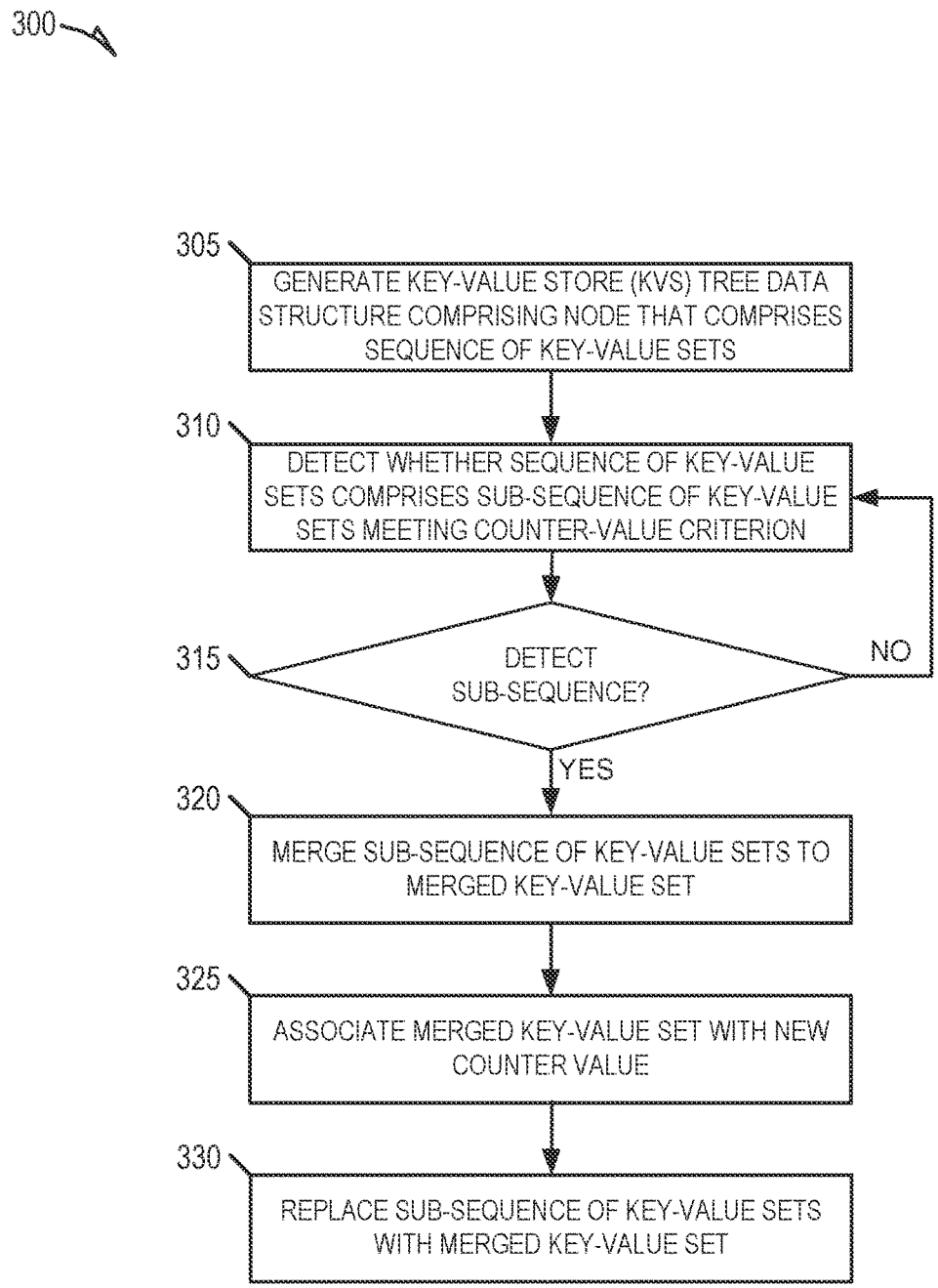
FIGS. 3 through 5 are a flow diagrams of example methods for counter-based merge operation, in accordance with some implementations of the present disclosure.
Figure 4:
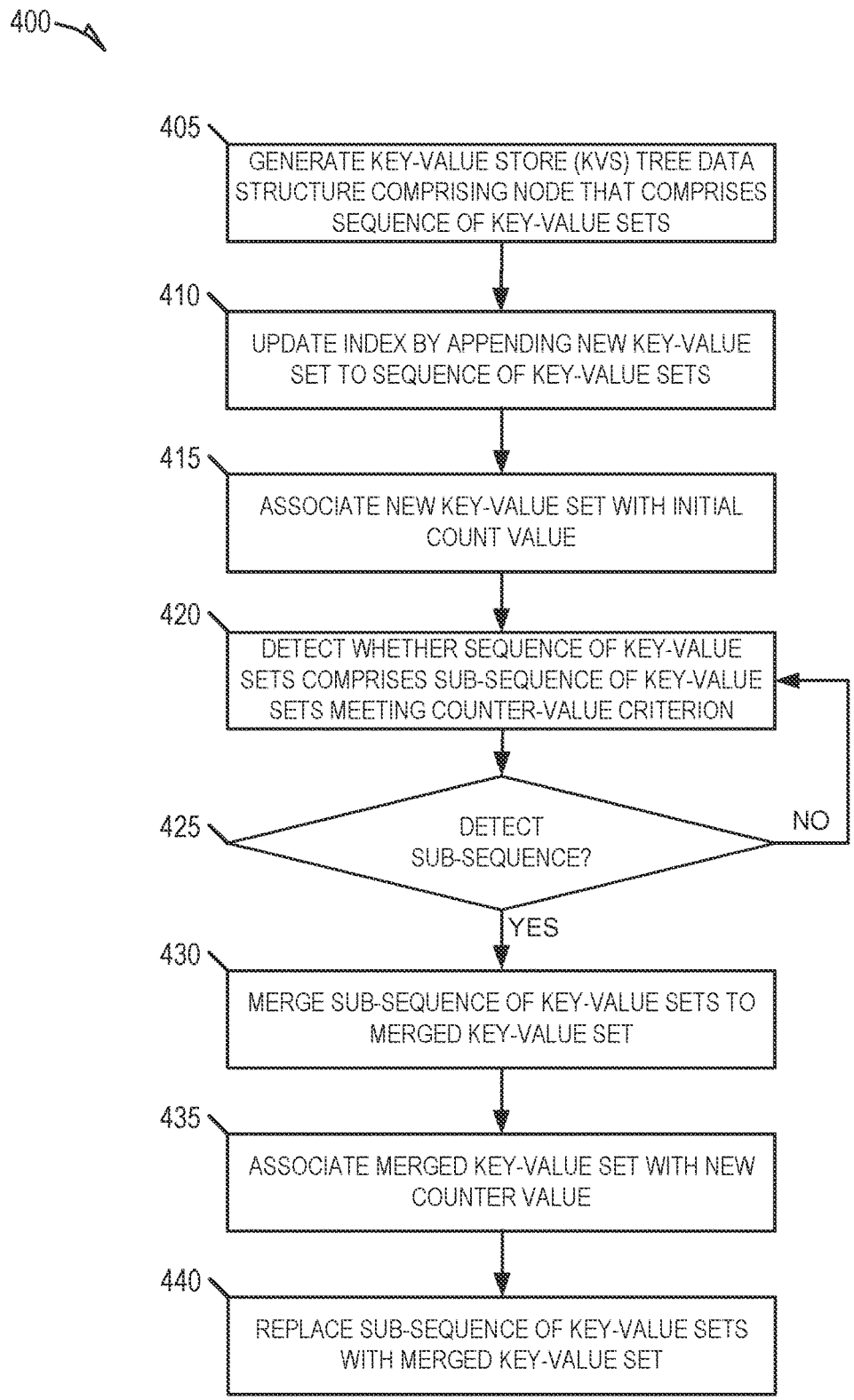
Figure 5:
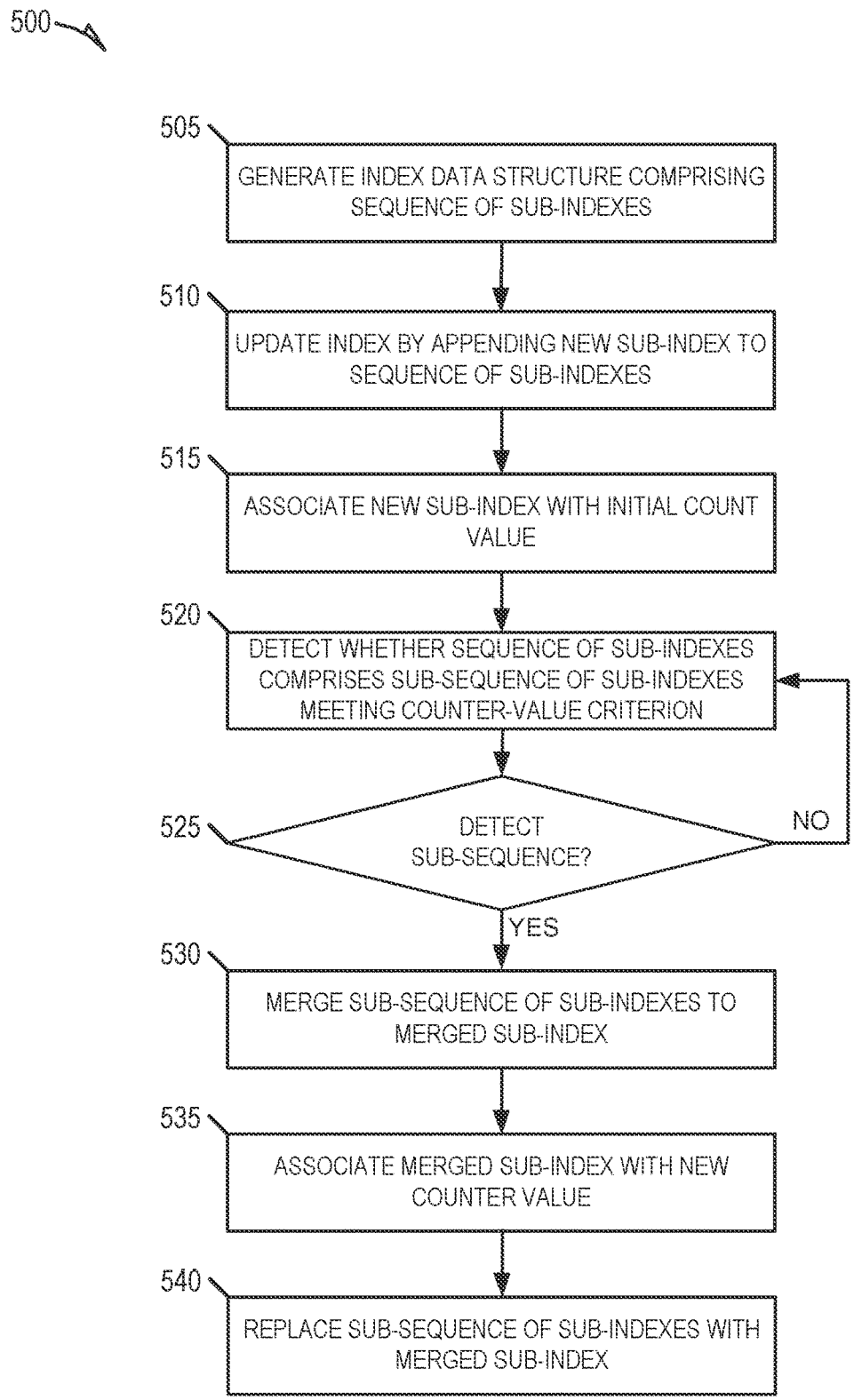

FIGS. 3 through 5 are flow diagrams of example methods for counter-based merge operations, in accordance with some implementations of the present disclosure. Any of methods 300, 400, 500 of FIGS. 3 through 5 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, one or more methods 300, 400, 500 of FIG. 3 through 5 are performed by the host system 120 of FIG. 1. In these embodiments, the methods 300, 400, 500 may be performed, at least in part, by the counter-based merge component 122. Alternatively, one or more methods of FIG. 3 through 5 are performed by the memory sub-system 110 of FIG. 1 (e.g., the processor of the memory sub-system controller 115). Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. Operations of the methods 300, 400, 500 of FIGS. 3-5 may be concurrently performed with respect to two or more erodes of the KVS tree.

Referring now to the method 300 of FIG. 3, at operation 305, a processing device of a host system (e.g., 120) generates, on a memory sub-system (e.g., 110), a key-value store tree data structure (KVS tree) that, comprises a set of nodes, where each node comprises a sequence of key-value sets (kvsets), where each kvset in the sequence of kvsets is associated with an individual count value, and where at least one kvset in the sequence of kvsets comprises a set of key blocks for storing one or more keys and a set of value blocks for storing one or more values. Alternatively, the KVS tree may be already generated (e.g., by another process) and, for some embodiments, the KVS tree is accessed at operation 305, where accessing the KVS tree can assist in subsequent operations of method 300 (e.g., operation 310).

At operation 310, the processing device of the host system detects whether the sequence of kvsets comprises a sub-sequence of kvsets that comprises a predetermined number of kvsets (e.g., 4 kvsets) where each kvset (in the sub-sequence) is associated with a similar count value (e.g., 0, 1, 2, etc.). At operation 315, if the processing device of the host system detects (at operation 310) the sub-sequence of kvsets comprises the predetermined number of kvsets where each kvset (in the sub-sequence) is associated with the similar count value, the method 300 proceeds to operation 320; otherwise the method 300 returns to operation 310.

At operation 320, the processing device of the host system merges the sub-sequence of kvsets to produce a merged kvset. According to some embodiments, the merged kvset that results from merging a sub-sequence of kvsets is associated with (e.g., inherits) the largest number (e.g., largest kvset number) associated with any kvset in the sub-sequence. At operation 325, the processing device of the host system associates (e.g., assigns) the merged kvset with a new count value that is generated based on the similar count value. For instance, as noted herein, generating the new count value that is based on the similar count value may comprise setting the new count value equal to the similar count value incremented by a specific value (e.g., 1). Subsequently, at operation 330, the processing device of the host system replaces the sub-sequence of kv sets, within the sequence of kv sets, with the merged kvset to produce an updated sequence of kvset.

Referring now to the method 400 of FIG. 4, at operation 405, a processing device of a host system (e.g., 120) generates, on a memory sub-system (e.g., 110), a key-value store tree data structure (KVS tree) that comprises a set of nodes, where each node comprises a sequence of key-value sets (kvsets), where each kvset in the sequence of kvsets is associated with an individual count value, and where at least one kvset in the sequence of kvsets comprises a set of key blocks for storing one or more keys and a set of value blocks for storing one or more values. Alternatively, the KVS tree may be already generated (e.g., by another process) and, for some embodiments, the KVS tree is accessed at operation 405, where accessing the KVS tree can assist in subsequent operations of method 400 (e.g., operation 410).

At operation 410, the processing device of the host system updates the node by appending a new kvset to the sequence of the kvsets. As noted herein, depending on the embodiment, the new kvset may be prepended to the sequence of kvsets of the node (e.g., where the newest kvsets in nodes are prepended to kvset sequences) or the new kvset may be postpended to the sequence (e.g., where the newest kvsets in nodes are postpended to kvset sequences). At operation 415, the processing device of the host system associates (e.g., assigns) the new kvset with an initial count value, which may be set to a default initial value (e.g., 0).

Alternatively, at operation 410, the processing device of the host system can detect whether an update to the node results in a new kvset being appended to the sequence of kvsets and, in response, the method 400 would proceed to perform one or more of operations 415 through 435.

For some embodiments, operations 420 through 440 of the method 400 are respectively similar to operations 310 through 330 of the method 300 described above with respect to FIG. 3.

Referring now to the method 500 of FIG. 5, at operation 505, a processing device of a host system (e.g., 120) generates, on a memory sub-system (e.g., 110), an index data structure that comprises a set of sub-indexes, where each sub-index in the sequence of sub-indexes is associated with an individual count value. Alternatively, the index data structure may be already generated (e.g., by another process) and, for some embodiments, the index data structure is accessed at operation 505, where accessing the index data structure can assist in subsequent operations of method 500 (e.g., operation 510). An example index data structure can include, without limitation, a key-value store tree data structure described herein, and an example of a sub-index can include, without limitation, a key-value set as described herein. Accordingly, depending on the embodiment, the index data structure can comprise something other than a KVS tree, and the sub-index can comprise something other than a key-value set.

At operation 510, the processing device of the host system updates the node by appending a new sub-index to the sequence of the kvsets. Depending on the embodiment, the new sub-index may be prepended to the sequence of sub-indexes of the node (e.g., where the newest sub-indexes are prepended to a sub-index sequence) or the new sub-index max be postpended to the sequence (e.g., where the newest sub-indexes are postpended to a sub-index sequence). At operation 515, the processing device of the host system associates (e.g., assigns) the new sub-index with an initial count value, which may be set to a default initial value (e.g., 0).

Alternatively, at operation 510, the processing device of the host system can detect whether the index data structure is updated with a new sub-index being appended to the sequence of sub-indexes and, in response, the method 500 would proceed to perform one or more of operations 515 through 535.

At operation 520, the processing device of the host system detects whether the sequence of sub-indexes comprises a sub-sequence of sub-indexes that comprises a predetermined number of sub-indexes (e.g., 4 sub-indexes) where each sub-index (in the sub-sequence) is associated with a similar count value (e.g., 0, 1, 2, etc.). At operation 525, if the processing device of the host system detects (at operation 520) the sub-sequence of sub-indexes comprises the predetermined number of sub-indexes where each sub-index (in the sub-sequence) is associated with the similar count value, the method 500 proceeds to operation 530 otherwise the method 500 returns to operation 520.

At operation 530, the processing device of the host system merges the sub-sequence of sub-indexes to produce a merged sub-index. At operation 535, the processing device of the host system associates (e.g., assigns) the merged sub-index with a new count value that is generated based on the similar count value. For instance, as noted herein, generating the new count value that is based on the similar count value may comprise setting the new count value equal to the similar count value incremented by a specific value (e.g., 1). Subsequently, at operation 540, the processing device of the host system replaces the sub-sequence of sub-indexes, within the sequence of kvsets, with the merged sub-index to produce an updated sequence of sub-index.

Figure 6:
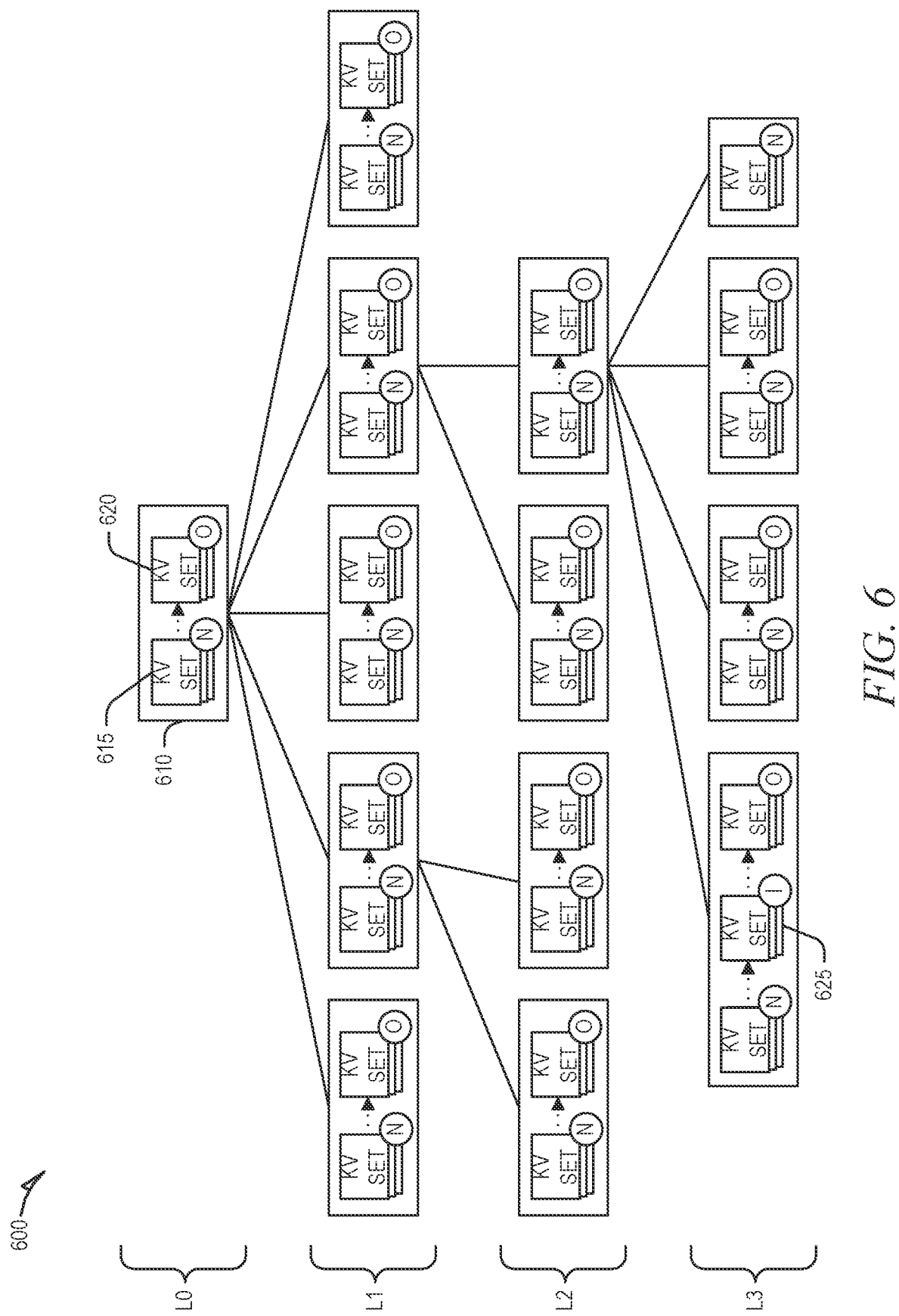
FIG. 6 is block diagram illustrating an example KVS tree that may be operated upon by a counter-based merge operation, in accordance with some implementations of the present disclosure.

FIG. 6 is block diagram illustrating an example KVS tree 600 that may be operated upon by a counter-based merge operation, in accordance with some implementations of the present disclosure. As noted herein, the KVS tree 600 comprises a key-value data structure that is organized as a tree. As a key-value data structure, values are stored in the KVS tree 600 with corresponding keys that reference the values. Specifically, key-entries may be used to contain both the key and additional information, such as a reference to the value. Keys themselves may have a total ordering within the KVS tree 600 and, as such, keys may be sorted amongst each other. Keys may also be divided into sub-keys, where the sub-keys are non-overlapping portions of a key. For some embodiments, the total ordering of keys is based on comparing like sub-keys between multiple keys (e.g., a first sub-key of a key is compared to the first sub-key of another key). Additionally, for some embodiments, a key prefix comprises a beginning portion of a key. When used, a key prefix may be composed of one or more sub-keys.

The KVS tree 600 comprises one or more nodes, such as node 610, each of which includes one or more key-value sets (kvsets). For some embodiments, one or more nodes (such as the node 610) each comprises a temporally ordered sequence of kvsets. As illustrated, kvset 615 comprises an 'N' badge to indicate that it is the newest of the sequence, while kvset 620 comprises an 'O' badge to indicate that it is the oldest of the sequence. Kvset 625 comprises an 'I' badge to indicate that it is intermediate in the sequence. These badges are used throughout to label kvsets; however, another badge (such as an 'X') denotes a specific kvset rather than its position in a sequence (e.g., new, intermediate, old, etc.), unless it is a tilde '~' in which case it is simply an anonymous kvset. As is explained in greater detail below, older kvsets (with older key blocks) occur lower in the KVS tree 600. Thus, pushing (e.g., spilling) kvsets down a tree-level, such as from L1 to L2, results in at least one new kvset, from a parent node, to be added to the newest position in a recipient child node of the parent node.

The KVS tree 600 comprises a determinative mapping for a key-value pair (stored by a key block and a value block) in a kvset of a given node (e.g., the node 610) to any one child node of the given node (e.g., any one of the child nodes of the node 610, which are represented by all the nodes at L1). The determinative mapping of the KVS tree 600 can mean that, given a key, an external entity could trace a path through nodes of the KVS tree 600 to a key block and a value block (of a key-value pair) for the key without knowing the contents of the KVS tree 600. This, for example, is different than a B-tree, for example, where the contents of the tree will determine where a given key's value will fall in order to maintain the search-optimized structure of the tree. In contrast, the determinative mapping of the KVS tree 600 can provide a rule such that, for example, given a key, one may calculate the child node at L3 that the key would map to even if the maximum tree-level (e.g., tree depth) is only at L1 at the moment. For some embodiments, the determinative mapping comprises a portion of a hash of a portion of the key. A sub-key may be hashed to arrive at a mapping set, and a portion of the mapping set may be used for any given level of the tree. Depending on the embodiment, the portion of the key may comprise the entire key.

For some embodiments, the hash comprises a multiple of non-overlapping portions including the portion of the hash. For instance, each of the multiple of non-overlapping portions may correspond to a level of the tree. The portion of the hash may be determined from the multiple of non-overlapping portions by a level of the node. Accordingly, a maximum number of child nodes for the node may be defined by a size of the portion of the hash, where the size of the portion of the hash may be a certain number of bits. For example, with respect to a hash of a key that results in eight hits, the eight bits may be divided into three sets comprising the first two hits, bits three through six, and bits seven and eight. Child nodes may be indexed based on the set of bits, such that child nodes at the first level (e.g., L1) have two bit names (based on bits one and two), child nodes on the second level (e.g., L2) have four-bit names (based on bits three through six), and child nodes on the third level (e.g., L3) have two hit names (based on bits seven and eight).

For some embodiments, the node 610 represents a root node of the KVS tree 600. The KVS tree 600 may be stored on data storage media implemented by a memory sub-system (e.g., 110), where the KVS tree 600 may be stored in media blocks of the data storage media. The media blocks of the data storage media may be block addressable.

Figure 7A:
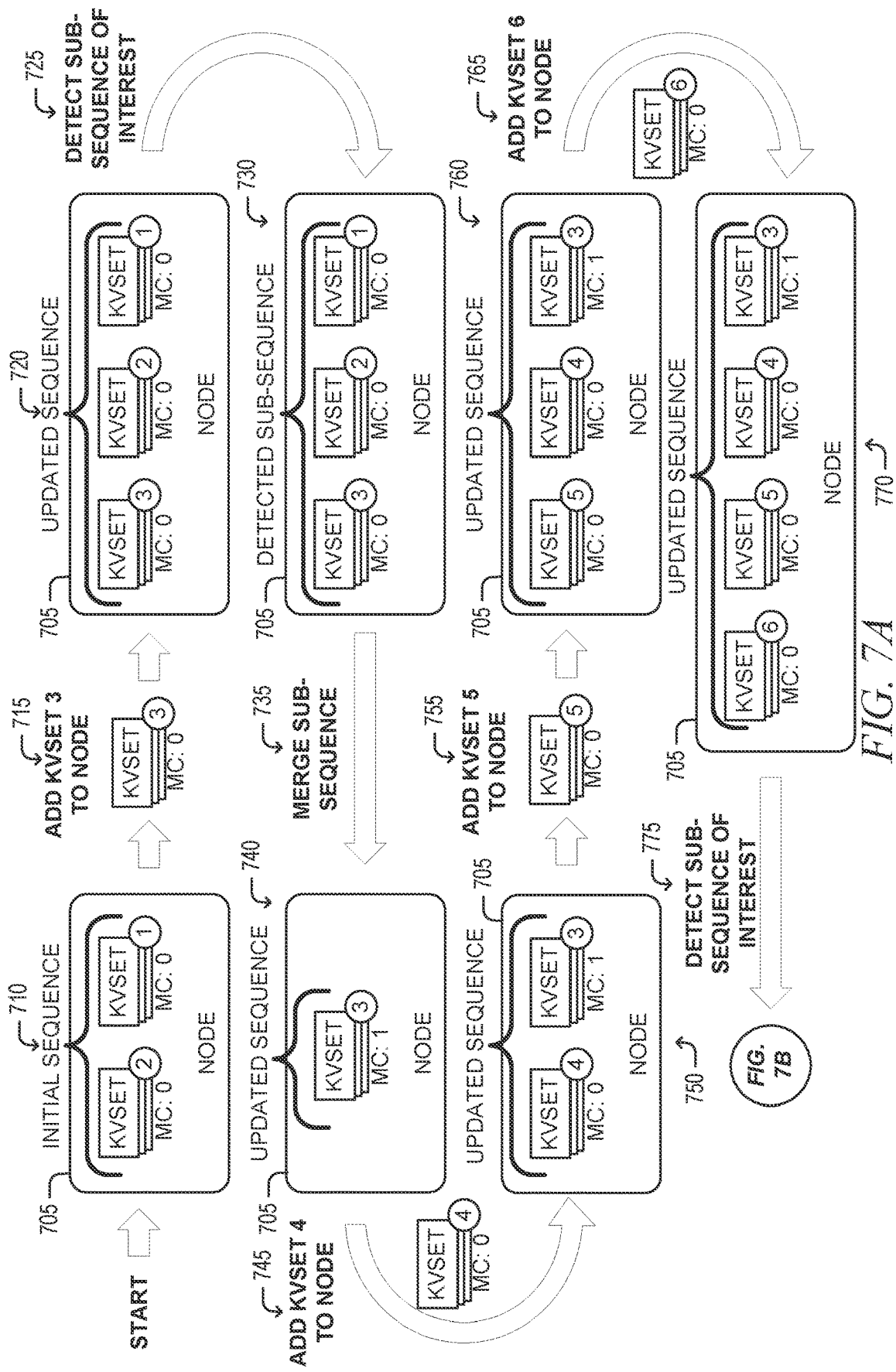
FIGS. 7A and 7B show a flow diagram illustrating an example counter-based merge operation performed with respect to a node of an example KVS tree data structure, in accordance with some implementations of the present disclosure.
Figure 7B:
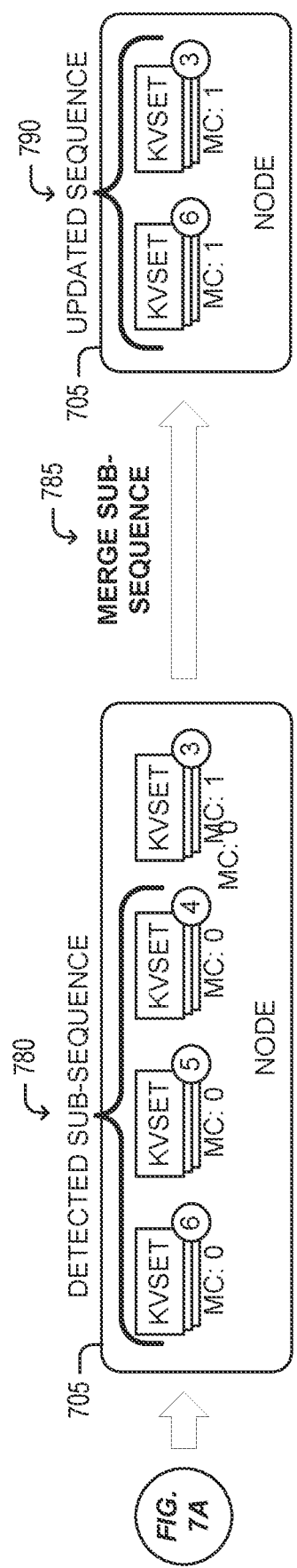

FIGS. 7A and 7B show a flow diagram illustrating an example counter-based merge operation performed with respect to a node 705 of an example tree, in accordance with some implementations of the present disclosure. For illustrative purposes, a sub-sequence of interest will be assumed to comprise a sub-sequence of key-value set (kvset) comprising three kvsets where each is associated with a similar count value (MC). In particular, FIG. 7A illustrates, at stage 710, an initial sequence of kvsets comprises a sequence of kvsets comprising KVSET 2 and KVSET 1, where each kvset is associated with a MC of 0. At stage 715, KVSET 3 is added to the node 705 and, as such, at stage 720, the node 705 comprises an updated sequence of kvsets comprising KVSET 3, KVSET 2, and KVSET 1, where each kvset is associated with a MC of 0. At stage 725, the counter-based merge operation detects a sub-sequence of interest, which comprises three kvsets (KVSET 3, KVSET 2, and KVSET 1) each associated with a similar MC of 0, as shown at stage 730. In response to detecting the sub-sequence, at stage 735, the counter-based merge operation merges the detected sub-sequence and, as shown at stage 740, the node 705 comprises a sequence of kvsets comprising the merged KVSET 3 associated with a MC of 1 (to reflect its number of mergers). As noted herein, for some embodiments, the merged kvset that results from merging a sub-sequence of kvsets is associated with (e.g., inherits) the largest number (e.g., largest kvset number) associated with any kvset in the sub-sequence.

At stage 745, KVSET 4 is added to the node 705 and, as such, at stage 750, the node 705 comprises an updated sequence of kvsets comprising KVSET 4 and merged KVSET 3, where KVSET 4 is associated with a MC of 0 and merged KVSET 3 is associated with a MC of 1. At stage 755, KVSET 5 is added to the node 705 and, as such, at stage 760, the node 705 comprises an updated sequence of kvsets comprising KVSET 5, KVSET 4, and merged KVSET 3, where KVSET 5 and KVSET 4 are associated with a MC of 0, and merged KVSET 3 is associated with a MC of 1. Then, at stage 765, KVSET 6 is added to the node 705 and, as such, at stage 770, the node 705 comprises an updated sequence of kvsets comprising KVSET 6, KVSET 5, KVSET 4, and merged KVSET 3, where each of KVSET 6, KVSET 5, and KVSET 4 is associated with a MC of 0, and merged KVSET 3 is associated with a MC of 1.

At stage 775, the counter-based merge operation detects a sub-sequence of interest, which comprises three kvsets (KVSET 6, KVSET 5, and KVSET 4) each associated with a similar MC of 0, as shown at stage 780 of FIG. 7B. Referring now to FIG. 7B, in response to detecting the sub-sequence, at stage 785, the counter-based merge operation merges the detected sub-sequence and, as shown at stage 790, the node 705 comprises a sequence of kvsets comprising the merged KVSET 6 and merged KVSET 3, each of which is associated with a MC of 1 (to reflect their respective number of mergers).

Figure 8A:
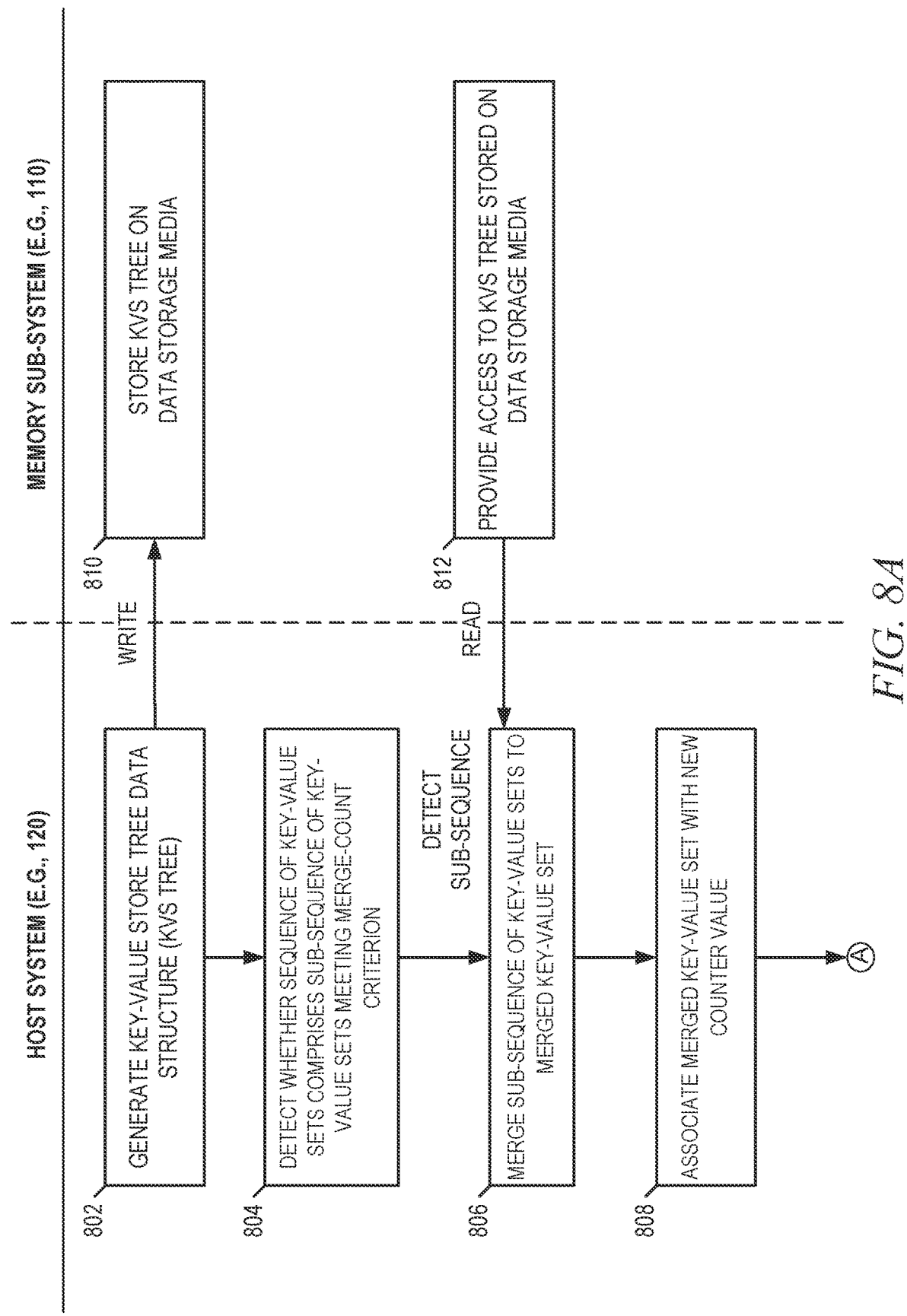
FIGS. 8A and 8B provide an interaction diagram illustrating interactions between components of a computing environment in the context of an example embodiment in which a method for counter-based merge is performed.
Figure 8B:
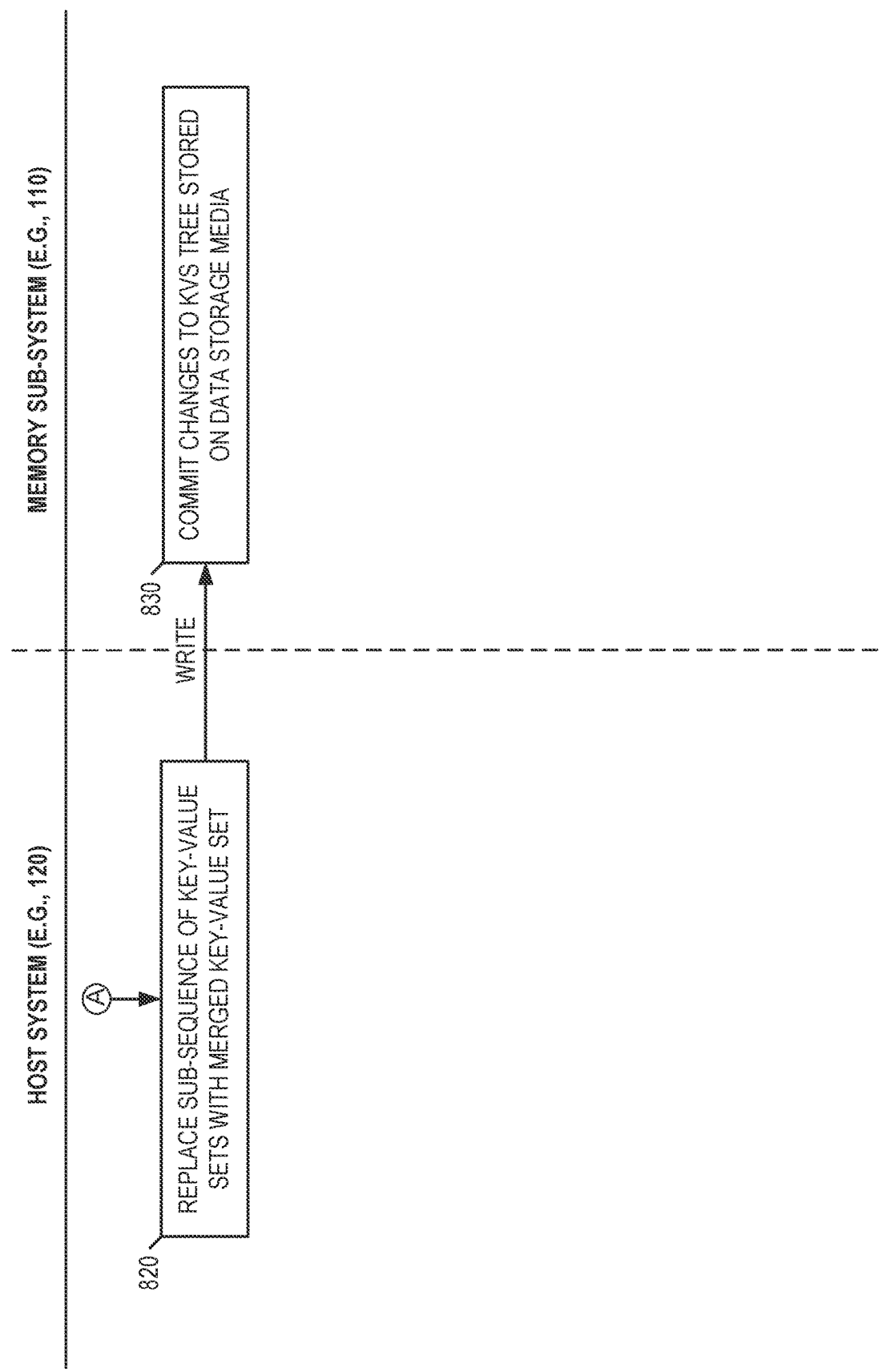

FIGS. 8A through 8B provide an interaction diagram illustrating interactions between components of the computing environment 100 in the context of an example embodiment in which a method for counter-based merge is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by the host system 120. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIGS. 8A through 8B, the host system can comprise the host system 120, and the memory sub-system can comprise the memory sub-system 110, where one or more of the memory components 112A to 112N can implement data storage media for storing a KVS tree operated by the host system 120.

As shown in FIG. 8A, at operation 802, the host system 120 generates a key-value store tree data structure (KVS tree), which the host system 120 writes to the memory sub-system 110 for storage. In response, at operation 810, the memory sub-system 110 stores the KVS tree on data storage media.

At operation 804, the host system 120 detects whether a sequence of sub-indexes of a given node of the KVS tree comprises a sub-sequence of key-value sets (kvsets) where the sub-sequence meets a merge-count criterion, such as the sub-sequence comprising a certain (e.g., predetermined) number of kvsets (e.g., 4 kvsets) where each kvset is associated with a similar count value (e.g., 0, 1, 2, etc.). Upon the host system 120 detecting the sub-sequence, at operation 806 the host system 120 merges (e.g., k-compaction or kv-compaction) the detected sub-sequence of kvsets to produce a merged kvset. To merge the sequence of kvsets of the given node, the host system 120 reads the KVS tree (e.g., reads the key-value sets of the sub-sequence) stored on the data storage media of the memory sub-system 110, and the memory sub-system 110 provides access to the KVS tree at operation 812. At operation 808, the host system 120 associates the merged kvset with a new counter value, which may be initialized to a value of 0 (or some other default initial value).

Referring now to FIG. 8B, after operation 808, at operation 820, the host system 120 replaces the sub-sequence of kvsets, in the sequence of kvsets, with the merged kvset, which is associated with the new counter value. The host system 120 writes these changes to the KVS tree stored on the data storage media of the memory sub-system 110, which commits these changes to the stored KVS tree at operation 830.

Figure 9:
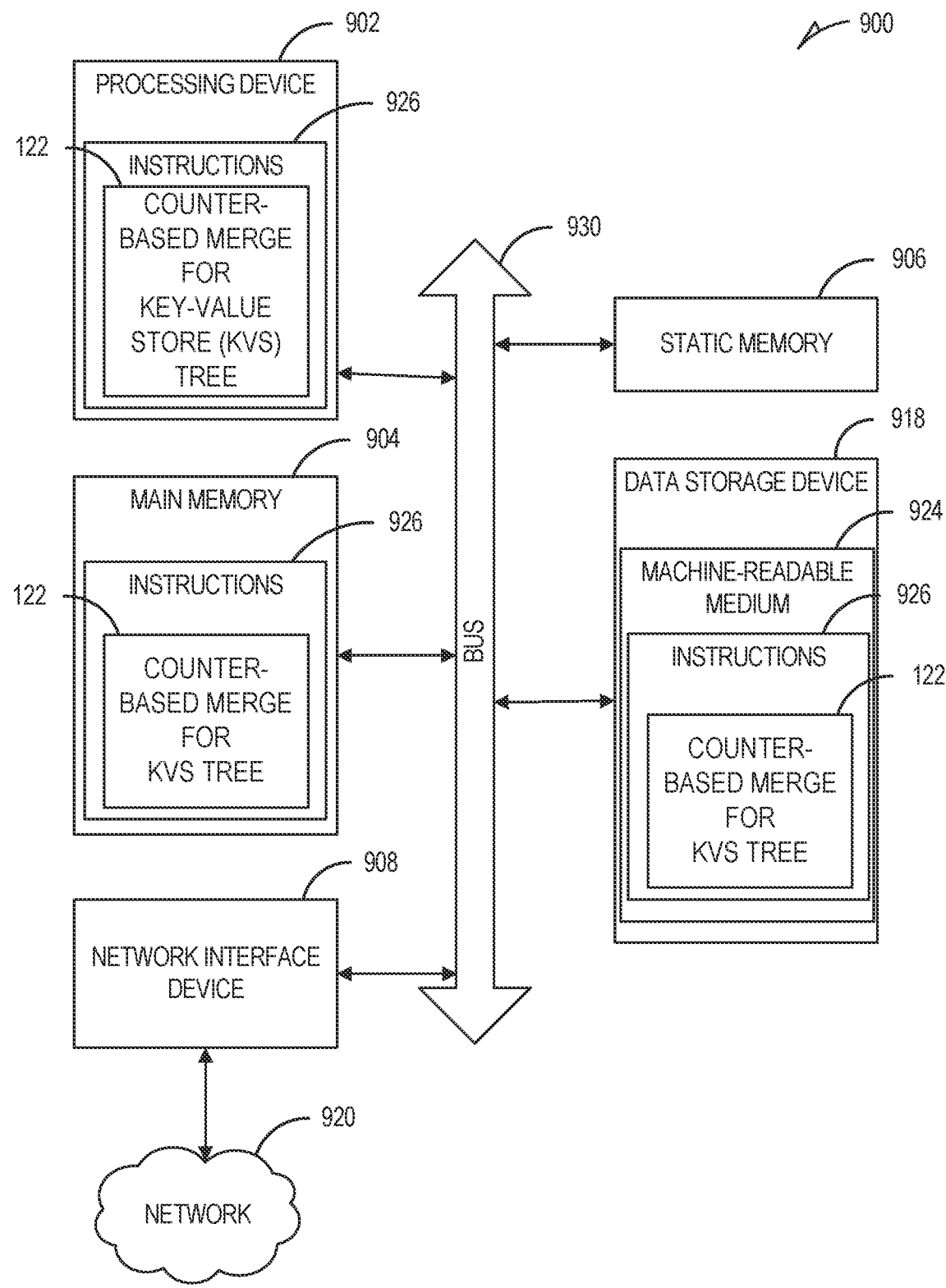
FIG. 9 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 9 illustrates an example machine in the form of a computer system 900 within which a set of instructions can be executed for causing the machine to perform any one or more of the methodologies discussed herein. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the counter-based merge component 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

The processing device 902 represents one or more general-purpose processing devices such as a microprocessor, a central processing unit, or the like. More particularly, the processing device 902 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 902 can also be one or more special-purpose processing devices such as an application specific integrated circuit (ASIC), a field programmable gate array (FPGA), a digital signal processor (DSP), a network processor, or the like. The processing device 902 is configured to execute instructions 926 for performing the operations and steps discussed herein. The computer system 900 can further include a network interface device 908 to communicate over a network 920.

The data storage device 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage device 918, and/or main memory 904 can correspond to the memory sub-system 110 of FIG. 1.

In one embodiment, the instructions 926 include instructions to implement functionality corresponding to a counter-based merge operation as described herein (e.g., the counter-based merge component 122 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer, Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from embodiments of the disclosure as set forth in the following claims. The specification and drawings are, accordingly, to be regarded in an illustrative sense rather than a restrictive sense.

EXAMPLES

Example 1 is a system comprising: a set of memory components storing a key-value store tree data structure, the key-value store tree data structure comprising a set of nodes, wherein a node in the set of nodes comprises a sequence of key-value sets, and each key-value set in the sequence of key-value sets is associated with an individual count value; and a processing device, operatively coupled to the set of memory components, configured to perform operations comprising: accessing, on the set of memory components, the key-value store tree data structure; detecting whether the sequence of key-value sets comprises a sub-sequence of key-value sets comprising a predetermined number of key-value sets where each key-value set is associated with a similar count value; and in response to detecting that the sequence of key-value sets comprises the sub-sequence of key-value sets: merging the sub-sequence of key-value sets to produce a merged key-value set; associating the merged key-value set with a new count value that is generated based on the similar count value; and replacing the sub-sequence of key-value sets, within the sequence of key-value sets, with the merged key-value set to produce an updated sequence of key-value sets.

In Example 2, the subject matter of Example 1 optionally includes wherein generating the new count value that is generated based on the similar count value comprises setting the new count value to be equal to the similar count value incremented by a specific value.

In Example 3, the subject matter of Example 1 or Example 2 optionally includes where the specific value comprises a value of one.

In Example 4, the subject matter of any one of Examples 1 to 3 optionally includes where the merged key-value set comprises a set of new key blocks that reference a set of existing value blocks of the sub-sequence of key-value sets, and the set of new key blocks is generated based on a set of existing key blocks of the sub-sequence of key-value sets.

In Example 5, the subject matter of any one of Examples 1 to 4 optionally includes where the set of new key blocks is generated based on the set of existing key blocks of the sub-sequence of key-value sets by copying values of the set of existing key blocks to the set of new key blocks such that the set of new key blocks comprises one or more references to the set of existing value blocks.

In Example 6, the subject matter of any one of Examples 1 to 5 optionally includes where the merged key-value set comprises a set of new value blocks and a set of new key blocks that reference the set of new value blocks, the set of new value blocks is generated based on a set of existing value blocks of the sub-sequence of key-value sets, and the set of new key blocks is generated based on a set of existing key blocks of the sequence of key-value sets.

In Example 7, the subject matter of any one of Examples 1 to 6 optionally includes where the set of new value blocks is generated based on the set of value key blocks of the sub-sequence of key-value sets by copying values of the set of existing value blocks to the set of new value blocks, and the set of new key blocks is generated based on the set of existing key blocks of the sub-sequence of key-value sets by copying values of the set of existing key blocks to the set of new key blocks.

In Example 8, the subject matter of any one of Examples 1 to 7 optionally includes where the replacing the sub-sequence of key-value sets, in the sequence of key-value sets, with the merged key-value set to produce the updated sequence of key-value sets comprises: deleting, from the node, each particular key-value set in the sub-sequence of key-value sets.

In Example 9, the subject matter of any one of Examples 1 to 8 optionally includes where the replacing the sub-sequence of key-value sets, in the sequence of key-value sets, with the merged key-value set to produce the updated sequence of key-value sets comprises: deleting one or more key blocks of each particular key-value set in the sub-sequence of key-value sets.

In Example 10, the subject matter of any one of Examples 1 to 9 optionally includes where the replacing the sub-sequence of key-value sets, in the sequence of key-value sets, with the merged key-value set to produce the updated sequence of key-value sets comprises: deleting one or more value blocks of each particular key-value set in the sub-sequence of key-value sets.

In Example 11, the subject matter of any one of Examples 1 to 10 optionally includes where the operations further comprise: detecting whether a second sub-sequence of key-value sets, in the updated sequence of key-value sets, comprises the predetermined number of key-value sets where each key-value set is associated with a second similar count value; in response to detecting the second sub-sequence of key-value sets in the updated sequence of key-value sets: merging the second sub-sequence of key-value sets to produce a second merged key-value set; associating the second merged key-value set with a second new count value that is generated based on the second similar count value; and replacing the second sub-sequence of key-value sets, within the updated sequence of key-value sets, with the merged key-value set to produce a second updated sequence of key-value sets.

In Example 12, the subject matter of any one of Examples 1 to 11 optionally includes where the sub-sequence of key-value sets comprises one or more key-value sets within the node.

Example 13 is a method comprising: generating, on a set of memory components, a key-value store tree data structure, the key-value store tree data structure comprising a set of nodes, wherein a node in the set of nodes comprises a sequence of key value sets, and each key-value set in the sequence of key-value sets is associated with an individual count value; detecting, by a processing device, whether the sequence of key-value sets comprises a sub-sequence of key-value sets comprising a predetermined number of key-value sets where each key-value set is associated with a similar count value; and in response to detecting that the sequence of key-value sets comprises the sub-sequence of key-value sets: merging, by the processing device, the sub-sequence of key-value sets to produce a merged key-value set; associating, by the processing device, the merged key-value set with a new count value that is generated based on the similar count value; and replacing, by the processing device, the sub-sequence of key-value sets, within the sequence of key-value sets, with the merged key-value set to produce an updated sequence of key-value sets.

In Example 14, the subject matter of Example 13 optionally includes where generating the new count value that is generated based on the similar count value comprises setting the new count value to be equal to the similar count value incremented by a specific value.

In Example 15, the subject matter of Example 13 or Example 14 optionally includes where the specific value comprises a value of one.

In Example 16, the subject matter of any one of Examples 13 to 15 optionally includes where the sub-sequence of the key-value sets comprises a last key-value set in the sequence of key-value sets.

In Example 17, the subject matter of any one of Examples 13 to 16 optionally includes where the method further comprises: updating the node by appending a new key-value set to the sequence of the key-value sets; and associating the new key-value set with an initial count value.

In Example 18, the subject matter of any one of Examples 13 to 17 optionally includes where the method further comprises: detecting whether an update to the node results in a new key-value set being appended to the sequence of key-value sets; and in response to detecting the update to the node, associating the new key-value set with an initial count value.

Example 19 is a non-transitory machine-readable storage medium comprising instructions that, when executed by a processing device, cause the processing device to: generate, on a set of memory components, an index data structure comprising an index to store a sequence of sub-indexes, each sub-index in the sequence storing a set of key-value pairs; update the index by appending a new sub-index to sequence of sub-indexes, the new sub-index comprising a new set of key-value-pairs; associate the new sub-index with an initial count value; detecting whether the sequence of sub-indexes comprises a sub-sequence of sub-indexes comprising a predetermined number of sub-indexes where each sub-index is associated with a similar count value; in response to detecting that the sequence of sub-indexes comprises the sub-sequence of sub-indexes: merging the sub-sequence of sub-indexes to produce a merged sub-index; associating the merged sub-index with a new count value that is generated based on the similar count value; and replacing the sub-sequence of sub-indexes, within the sequence of sub-indexes, with the merged sub-index set to produce an updated sequence of sub-indexes.

In Example 20, the subject matter of Example 19 optionally includes where the index data structure comprises a key-value store tree data structure, and each sub-index in the sequence comprises a key-value set comprising a set of key blocks for storing one or more keys of the set of key-value pairs and a set of value blocks for storing one or more values of the set of key-value pairs.

What is claimed is:

1. A system comprising:
   a set of memory components storing a key-value store tree data structure, the key-value store tree data structure comprising a set of nodes, wherein a node in the set of nodes comprises a sequence of key value sets, each key-value set in the sequence of key-value sets is associated with an individual count value, and the sequence of key-value sets comprising a first sub-sequence of key-value sets that comprises a predetermined number of key-value sets where each key-value set is associated with a similar count value; and
   a processing device, operatively coupled to the set of memory components, configured to perform operations comprising:
   merging the first sub-sequence of key-value sets to produce a merged key-value set;
   associating the merged key-value set with a first new count value, the first new count value being generated based on the similar count value; and
   replacing the first sub-sequence of key-value sets, within the sequence of key-value sets, with the merged key-value set to produce an updated sequence of key-value sets.

2. The system of claim 1, wherein generating the first new count value based on the similar count value comprises setting the first new count value to be equal to the similar count value incremented by a specific value.

3. The system of claim 2, wherein the specific value comprises a value of one.

4. The system of claim 1, wherein the merged key-value set comprises a set of new key blocks that reference a set of existing value blocks of the first sub-sequence of key-value sets, and the set of new key blocks is generated based on a set of existing key blocks of the first sub-sequence of key-value sets.

5. The system of claim 4, wherein the set of new key blocks is generated based on the set of existing key blocks of the first sub-sequence of key-value sets by copying values of the set of existing key blocks to the set of new key blocks such that the set of new key blocks comprising one or more references to the set of existing value blocks.

6. The system of claim 1, wherein the merged key-value set comprises a set of new value blocks and a set of new key blocks that reference the set of new value blocks, the set of new value blocks is generated based on a set of existing value blocks of the first sub-sequence of key-value sets, and the set of new key blocks is generated based on a set of existing key blocks of the sequence of key-value sets.

7. The system of claim 6, wherein the set of new value blocks is generated based on the set of value key blocks of the first sub-sequence of key-value sets by copying values of the set of existing value blocks to the set of new value blocks, and the set of new key blocks is generated based on the set of existing key blocks of the first sub-sequence of key-value sets by copying values of the set of existing key blocks to the set of new key blocks.

8. The system of claim 1, wherein the replacing the first sub-sequence of key-value sets, in the sequence of key-value sets, with the merged key-value set to produce the updated sequence of key-value sets comprises:
   deleting, from the node, each particular key-value set in the first sub-sequence of key-value sets.

9. The system of claim 1, wherein the replacing the first sub-sequence of key-value sets, in the sequence of key-value sets, with the merged key-value set to produce the updated sequence of key-value sets comprises:
   deleting one or more key blocks of each particular key-value set in the first sub-sequence of key-value sets.

10. The system of claim 1, wherein the replacing the first sub-sequence of key-value sets, in the sequence of key-value sets, with the merged key-value set to produce the updated sequence of key-value sets comprises:
    deleting one or more value blocks of each particular key-value set in the first sub-sequence of key-value sets.

11. The system of claim 1, wherein the operations further comprise:
    merging a second sub-sequence of key-value sets, in the updated sequence of key-value sets, to produce a second merged key-value set;
    associating the second merged key-value set with a second new count value, the second new count value being generated based on a second similar count value; and
    replacing the second sub-sequence of key-value sets, within the updated sequence of key-value sets, with the merged key-value set to produce a second updated sequence of key-value sets.

12. The system of claim 1, wherein the first sub-sequence of key-value sets comprises one or more key-value sets within the node.

13. The system of claim 1, wherein the key-value store tree data structure implements an index data structure, the sequence of key value sets comprises a sequence of sub-indexes, each key-value set comprising a sub-index, the operations further comprising:
    updating the index data structure by appending a new sub-index to the sequence of sub-indexes, the new sub-index comprising a new set of key-value sets; and
    associating the new sub-index with an initial count value.

14. A method comprising:
generating, on a set of memory components, a key-value store tree data structure, the key-value store tree data structure comprising a set of nodes, wherein a node in the set of nodes comprises a sequence of key value sets, each key-value set in the sequence of key-value sets is associated with an individual count value, and the sequence of key-value sets comprising a first sub-sequence of key-value sets that comprises a predetermined number of key-value sets where each key-value set is associated with a similar count value;
merging, by a processing device, the first sub-sequence of key-value sets to produce a merged key-value set;
associating, by the processing device, the merged key-value set with a first new count value, the first new count value being generated based on the similar count value; and
replacing, by the processing device, the first sub-sequence of key-value sets, within the sequence of key-value sets, with the merged key-value set to produce an updated sequence of key-value sets.

15. The method of claim 14, wherein generating the first new count value based on the similar count value comprises setting the first new count value to be equal to the similar count value incremented by a specific value.

16. The method of claim 15, wherein the specific value comprises a value of one.

17. The method of claim 14, wherein the first sub-sequence of the key-value sets comprises a last key-value set in the sequence of key-value sets.

18. The method of claim 14, further comprising:
updating the node by appending a new key-value set to the sequence of the key-value sets; and
associating the new key-value set with an initial count value.

19. The method of claim 14, further comprising:
detecting whether an update to the node results in a new key-value set being appended to the sequence of key-value sets; and
in response to detecting the update to the node, associating the new key-value set with an initial count value.

20. A non-transitory machine-readable storage medium comprising instructions that, when executed by a processing device, cause the processing device to perform operations comprising:
generating, on a set of memory components, a key-value store tree data structure, the key-value store tree data structure comprising a set of nodes, wherein a node in the set of nodes comprises a sequence of key value sets, each key-value set in the sequence of key-value sets is associated with an individual count value, and the sequence of key-value sets comprising a first sub-sequence of key-value sets that comprises a predetermined number of key-value sets where each key-value set is associated with a similar count value;
merging the first sub-sequence of sub-indexes to produce a merged sub-index;
associating the merged sub-index with a first new count value, the first new count value being generated based on the similar count value; and
replacing the first sub-sequence of sub-indexes, within the sequence of sub-indexes, with the merged sub-index set to produce an updated sequence of sub-indexes.

* * * * *